United States Patent
Yoo

(10) Patent No.: US 12,096,208 B2
(45) Date of Patent: Sep. 17, 2024

(54) VIRTUAL CODE-BASED CONTROL SYSTEM, METHOD AND PROGRAM, CONTROL DEVICE AND CONTROL SIGNAL GENERATING MEANS FOR UNMANNED MOVING OBJECT

(71) Applicant: SSENSTONE INC., Seoul (KR)

(72) Inventor: Chang Hun Yoo, Seoul (KR)

(73) Assignee: SSENSTONE INC., Seoul (KR)

(*) Notice: Subject to any disclaimer, the term of this patent is extended or adjusted under 35 U.S.C. 154(b) by 512 days.

(21) Appl. No.: 17/429,302

(22) PCT Filed: Feb. 7, 2020

(86) PCT No.: PCT/KR2020/001771
§ 371 (c)(1),
(2) Date: Aug. 6, 2021

(87) PCT Pub. No.: WO2020/162710
PCT Pub. Date: Aug. 13, 2020

(65) Prior Publication Data
US 2022/0109985 A1     Apr. 7, 2022

(30) Foreign Application Priority Data

Feb. 8, 2019   (KR) .................. 10-2019-0015223
Feb. 7, 2020   (KR) .................. 10-2020-0014862

(51) Int. Cl.
*H04W 12/37*     (2021.01)
*G08C 17/02*     (2006.01)
(Continued)

(52) U.S. Cl.
CPC .......... *H04W 12/037* (2021.01); *G08C 17/02* (2013.01); *H04W 12/121* (2021.01)

(58) Field of Classification Search
CPC .. H04W 12/037; H04W 12/121; G08C 17/02; G05B 19/04; G05D 1/00; G05D 1/02
See application file for complete search history.

(56) References Cited

U.S. PATENT DOCUMENTS 5,191,610 A      3/1993  Hill et al.
9,544,047 B2 *   1/2017  Sampigethaya ..... G08G 5/0013
(Continued)

FOREIGN PATENT DOCUMENTS

EP       0813170 A2     12/1997
JP       2016-106298    6/2016
(Continued)

OTHER PUBLICATIONS

Notice of Allowance dated Mar. 19, 2021 for Korean Patent Application No. 10-2020-0014862 and its English translation provided by Applicant's foreign counsel.
(Continued)

*Primary Examiner* — Matthew Smithers
(74) *Attorney, Agent, or Firm* — Studebaker & Brackett PC

(57) ABSTRACT

The present invention relates to a virtual code-based control system, method and program, control device and control signal generation means. A control signal-based control method including a virtual code according to an embodiment of the present invention includes: a control signal reception step in which the control module receives the control signal generated at a specific time point from the control signal generation means, the control signal includes a specific virtual code, and the virtual code is generated by combining a plurality of detail codes according to a specific rule; extracting, by the control module, a plurality of detail codes included in the virtual code; and a command search step in which the control module searches a storage location including a specific command based on a plurality of detail codes, (Continued)

wherein the virtual code is generated differently according to the command at the same time point, and is generated differently for each unit count, wherein the control module is built-in or installed in the control device, wherein when a normally generated virtual code is received for each unit count, based on the plurality of detail codes, a search starting point and a search path are determined and the search is performed with the storage location, wherein the unit count is set at a specific time interval and is changed as the time interval elapses.

9 Claims, 17 Drawing Sheets

(51) Int. Cl.
*H04W 12/037* (2021.01)
*H04W 12/121* (2021.01)

(56) References Cited

U.S. PATENT DOCUMENTS

| | | | |
|---|---|---|---|
| 9,545,995 B1* | 1/2017 | Chau | G05D 1/0022 |
| 9,871,772 B1 | 1/2018 | Weinstein et al. | |
| 9,992,210 B2* | 6/2018 | Luckett, Jr. | H04L 63/1416 |
| 10,551,834 B2* | 2/2020 | Lee | G05D 1/0202 |
| 10,991,242 B2* | 4/2021 | Taylor | H04Q 9/00 |
| 11,377,233 B1* | 7/2022 | Cook | H04L 43/50 |
| 2003/0016119 A1 | 1/2003 | Teich | |
| 2003/0084327 A1* | 5/2003 | Lingafelt | H04L 63/1458 |
| | | | 726/23 |
| 2003/0224729 A1* | 12/2003 | Arnold | G08C 17/02 |
| | | | 455/39 |
| 2007/0090920 A1* | 4/2007 | Canter | G07C 9/27 |
| | | | 340/5.7 |
| 2009/0051486 A1* | 2/2009 | Denison | G07C 9/00857 |
| | | | 340/5.9 |
| 2009/0128392 A1 | 5/2009 | Hardacker et al. | |
| 2009/0132852 A1* | 5/2009 | Sekiya | G06K 7/10811 |
| | | | 712/225 |
| 2011/0307696 A1* | 12/2011 | Masuda | H04L 67/52 |
| | | | 713/168 |
| 2013/0062971 A1* | 3/2013 | Filippenko | H01H 71/70 |
| | | | 307/143 |
| 2016/0173495 A1* | 6/2016 | Joo | H04L 63/1425 |
| | | | 713/171 |
| 2016/0227404 A1* | 8/2016 | Kollu | H04L 63/14 |
| 2017/0026183 A1* | 1/2017 | Strong | H04L 9/3247 |
| 2018/0089420 A1* | 3/2018 | Daube | G06F 21/74 |
| 2018/0145867 A1* | 5/2018 | Zhu | G06F 21/31 |
| 2018/0176224 A1* | 6/2018 | Cho | H04W 4/70 |
| 2019/0369641 A1* | 12/2019 | Gillett | B62D 57/028 |

FOREIGN PATENT DOCUMENTS

| | | |
|---|---|---|
| JP | 2019-32501 | 2/2019 |
| JP | 6469796 B1 | 2/2019 |
| KR | 10-2012-0118824 | 10/2012 |
| KR | 10-1316466 B1 | 10/2013 |
| KR | 10-2015-0117879 | 10/2015 |
| KR | 10-2015-0146377 | 12/2015 |
| KR | 10-1718695 | 3/2017 |
| KR | 10-2018-0038231 | 4/2018 |
| WO | 98/01975 A1 | 1/1998 |

OTHER PUBLICATIONS

International Search Report for PCT/KR2020/001771 mailed on May 15, 2020 and its English translation from WIPO (published as WO2020/162710).

Written Opinion of the International Searching Authority for PCT/KR2020/001771 mailed on May 15, 2020 and its English translation by Google Translate (published as WO2020/162710).

An Office Action mailed by the Korean Intellectual Property Office on Mar. 27, 2023, which corresponds to Korean Patent Application No. 10-2021-0080623 and is related to U.S. Appl. No. 17/429,302.

The extended European search report issued by the European Patent Office on Oct. 26, 2022, which corresponds to European Application No. 20753266.4-1218 and is related to U.S. Appl. No. 17/429,302.

Cheon Jung Hee et al., "Toward a Secure Drone System: Flying With Real-Time Homomorphic Authenticated Encryption", IEEE Access, vol. 6, Mar. 26, 2018, pp. 24325-24339, XP011684140, doi: 10.1109/ACCESS.2018.2819189.

An Office Action; "Notice of Reasons for Refusal," mailed by the Japanese Patent Office on Aug. 9, 2022, which corresponds to Japanese Patent Application No. 2021-546271 and is related to U.S. Appl. No. 17/429,302.

Toshiyuki Ito et al., "Security Enhancement of Drone Control Communications by Quantum Key Distribution", IEICE Technical Report, vol. 115, No. 448, Feb. 9, 2016, pp. 47-51, Institute of Electronics, Information and Communication Engineers (IEICE).

* cited by examiner

VIRTUAL CODE-BASED CONTROL SYSTEM, METHOD AND PROGRAM, CONTROL DEVICE AND CONTROL SIGNAL GENERATING MEANS FOR UNMANNED MOVING OBJECT

CROSS-REFERENCE TO RELATED APPLICATIONS

The present application is the U.S. National Phase of PCT Application No. PCT/KR2020/001771 filed on Feb. 7, 2020, which claims the priority to Korean Patent Application No. 10-2019-0015223 filed with the Korean Intellectual Property Office on Feb. 8, 2019 and Korean Patent Application No, 10-2020-0014862 filed with the Korean Intellectual Property Office on Feb. 7, 2020, the entire contents of which are incorporated herein by reference.

TECHNICAL FIELD

The present invention relates to a virtual code-based unmanned moving object control system, method and program, control device, and control signal generating means.

BACKGROUND ART

In general, in order to control a control device (e.g., an Internet of Things (IoT) device or an unmanned moving body), a wireless communication signal is transmitted to a separate terminal device (e.g., a mobile terminal in which a specific application is installed, a remote controller, or a controller). The terminal device includes a control command in the wireless communication signal and transmits the wireless communication signal to the control device.

However, if a specific command is simply converted into code and transmitted, others may easily check the command code for the control device, and the same command is transmitted using the same wireless communication signal (e.g., an RF signal of the same frequency when a control signal is transmitted as an RF signal), so that the control device may be controlled. That is, a situation arises in which the user's right to control the control device is seized by another person.

Accordingly, there is a need for a control system, method, and program that prevent others from taking control of a control device by acquiring a command code of a specific time point as the command code is changed for each time point.

DESCRIPTION OF EMBODIMENTS

Technical Problem

The present invention is to provide a virtual code-based control system, method and program, control device, and control signal generating means, which detect and verify an actual command in a control device using a virtual code that varies for each unit count and is distinguished according to the command, thereby preventing another person from seizing control as a control signal including a specific command is transmitted.

The problem to be solved by the present invention is not limited to the problems mentioned above, and other problems that are not mentioned will be clearly understood by those skilled in the art from the following description.

Solution To Problem

A control device according to an embodiment of the present invention includes: a wireless communication module configured to receive a control signal transmitted at a specific time point from a control signal generation means, wherein the control signal includes a virtual control command that is a specific virtual code; a control module configured to extract the virtual control command from the control signal and then search for an actual control command corresponding to the virtual control command; and a control command calculation module configured to calculate an individual control command for controlling one or more driving units based on the actual control command, wherein the virtual control command for each actual control command is changed and generated for each unit time, wherein when the actual control command includes a first control command and a second control command, the virtual control command for the first control command is generated not to overlap with the virtual control command for the second control command.

Also, in another embodiment, the control module includes: a detail code extraction unit configured to extract a plurality of detail codes included in the virtual control command; and a command search unit configured to search a storage location including a specific actual control command based on a plurality of detail codes, wherein the virtual control command is generated by combining a first code and a second code included in a plurality of detail codes according to a specific rule, wherein the first code or the second code is generated differently according to the actual control command at the same time point, and is generated differently for each unit count.

Also, in another embodiment, when a normally generated virtual control command is received for each unit count, the command search unit determines, as the storage location, a point moved along a search path corresponding to the second code from the starting point corresponding to the first code, wherein the unit count is set at a specific time interval, and is changed as the time interval elapses.

Also, in another embodiment, the control module further includes a virtual code verification unit that verifies whether a virtual code is normally generated at the current time point based on the one or more detail codes.

Also, in another embodiment, the control module and the control command generation module are embedded as software in one chip.

Also, in another embodiment, the control device further includes a sensor module including one or more sensors and calculating a state estimation value of the control device based on the sensed data, wherein the control command calculation module is configured to calculate the individual control command by reflecting the state estimation value in the actual control command obtained from the control module.

A control device according to another embodiment of the present invention includes a control command acquisition module configured to acquire an actual control command based on a user's manipulation input; a control signal generation module configured to generate a virtual control command in real time based on the actual control command; and a wireless communication module configured to transmit the virtual control command to a control device based on a specific protocol, wherein the virtual control command for each actual control command is changed and generated for each unit time, wherein when the actual control command includes a first control command and a second control command, the virtual control command for the first control command is generated not to overlap with the virtual control command for the second control command.

Also, in another embodiment, the virtual control command is generated with the same code length as the actual control command.

Also, in another embodiment, the virtual control command is generated by combining a plurality of detail codes used for search of the actual control command storage location in a control module in the control device.

Also, in another embodiment, the virtual control command is generated by using a unique value of the control device connected to the control device as seed data.

Advantageous Effects of Disclosure

According to the present invention as described above, it is possible to prevent the control right from being seized as another person transmits a command to the control device. In other words, it is impossible to generate a virtual code that matches a specific command at a specific time point unless others duplicate the user's control signal generating means, so that it is possible to prevent the control device from being controlled by a device other than the control signal generating means matched with the control device.

In addition, as duplicated virtual codes do not occur regardless of time points for different commands, the problem of erroneously understanding the command in the control module may not occur.

MODE OF DISCLOSURE

Figure 1:
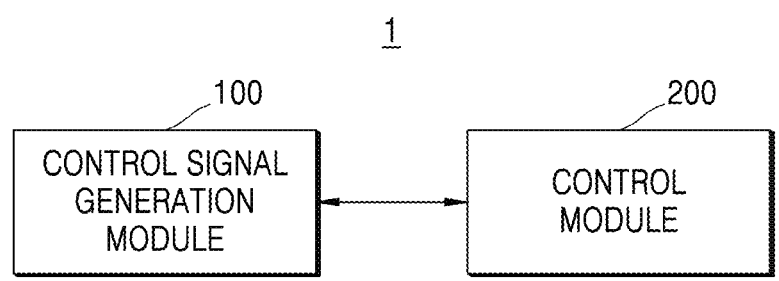
FIG. 1 is a block diagram of a device control system based on a virtual code according to an embodiment of the present invention.

Hereinafter, preferred embodiments of the present invention will be described in detail with reference to the accompanying drawings. Advantages and features of the present invention, and a method of achieving them, will become apparent with reference to the embodiments described below in detail in conjunction with the accompanying drawings. However, the present invention is not limited to the embodiments disclosed below, but may be implemented in various different forms, and only these embodiments are provided so that the disclosure of the present invention is complete, and to fully inform those of ordinary skill in the scope of the invention in the technical field to which the present invention belongs, and the invention is only defined by the scope of the claims. Like reference numerals refer to like elements throughout the specification.

Unless otherwise defined, all terms (including technical and scientific terms) used herein may be used with the meaning commonly understood by those of ordinary skill in the art to which the present invention belongs. In addition, terms defined in a commonly used dictionary are not to be interpreted ideally or excessively unless clearly defined in particular.

The terms used in this specification are for describing exemplary embodiments and are not intended to limit the present invention. In this specification, the singular form also includes the plural form unless specifically stated in the phrase. As used herein, "comprises" and/or "comprising" does not exclude the presence or addition of one or more other components in addition to the stated components.

In this specification, 'control device' includes all devices controlled through wireless communication. For example, the control device may include an unmanned moving object (unmanned vehicle), a home appliance (e.g., a TV, a speaker, an air conditioner, etc.).

In this specification, a 'control signal' refers to a wireless communication signal transmitted for control or regulation of a control device.

In the present specification, a 'command' means a predetermined control command for a control device. A 'command' may be generated as specific code data.

In this specification, a 'virtual code' is a code temporarily generated to be connected to a command, and is a code of a specific number of characters including numbers.

In the present specification, 'character' is a component configuring a code, and includes all or part of uppercase letters, lowercase letters, numbers, and special characters.

In this specification, 'code' means a character string in which characters are listed.

In this specification, 'detail code' means some code included in the virtual code. That is, when the virtual code is generated by combining a plurality of separately generated codes, the detail code refers to individual codes that are separately generated and configure the virtual code.

In the present specification, a 'unit count' is a unit defined as being set at a specific time interval and changing as the time interval elapses. For example, 1 count may be set to a specific time interval (e.g., 1.5 seconds) and used.

In this specification, a 'virtual code generation function' refers to a function used to generate a virtual code.

Hereinafter, with reference to the drawings, a detailed description of the virtual code-based control system, method and program, control device, and control signal generating means according to embodiments of the present invention will be described.

FIG. 1 is a connection relationship diagram of a virtual code-based control system according to an embodiment of the present invention.

Figure 2:
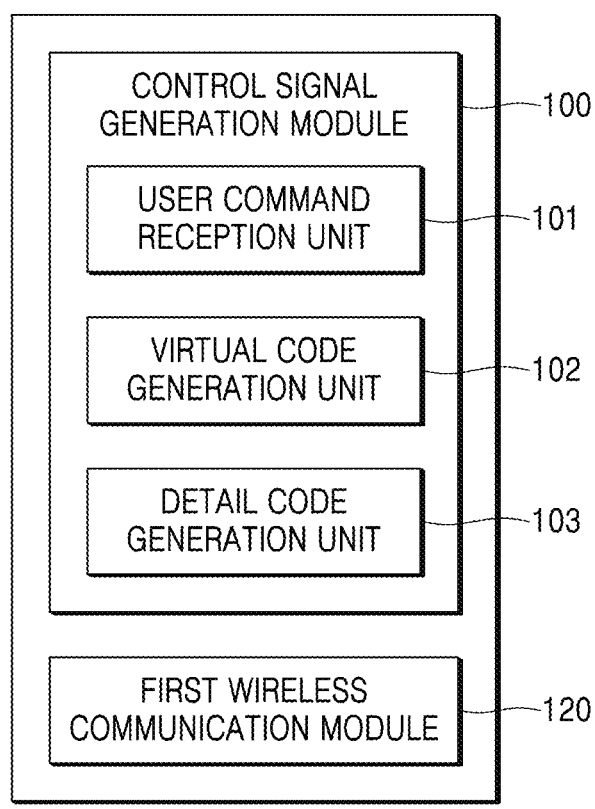
FIG. 2 is an internal configuration diagram of a control signal generation means according to an embodiment of the present invention.

FIG. 2 is an internal configuration diagram of a control signal generation means according to another embodiment of the present invention.

Figure 4:
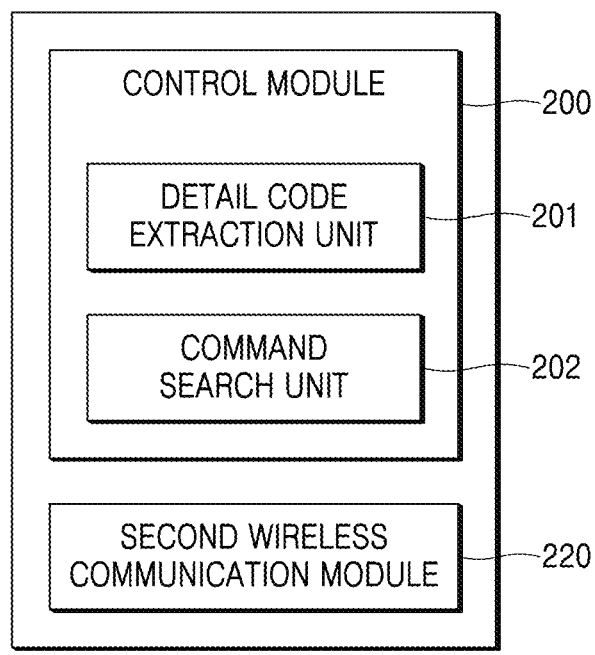
FIGS. 4 and 5 are internal configuration diagrams of a control device according to an embodiment of the present invention.

FIG. 4 is an internal configuration diagram of a control device according to an embodiment of the present invention.

Referring to FIGS. 1, 2 and 4, a virtual code-based control system 1 according to an embodiment of the present invention includes: a control signal generation module 100; and a control module 200.

The control signal generation module 100 serves to generate a virtual code including information for the control module 200 to search for a command. That is, the control signal generation module 100 generates a virtual code according to the virtual code generation function. At this time, since the control module 200 searches for a command based on the virtual code, the control signal generation module 100 may not store the command. Through this, it is possible to prevent leakage of the connection relationship between the command and the virtual code generation function through hacking of the control signal generation module 100. A detailed description of the virtual code generation function will be described later. The control signal generation module 100 may be included in a control signal generation means for controlling a control device (e.g., a controller connected to the control device through wireless communication, an application for controlling a control device installed or built in a mobile terminal, etc.).

The control module 200 is built-in or installed in the control device. The control module 200 serves to search for a command based on the virtual code generated and provided by the control signal generation module 100. The control module 200 may store the same virtual code generation function as the control signal generation module 100 to search for a command from the virtual code received from the control signal generation module 100. A detailed description of a method in which the control module 200 searches for a command based on a virtual code will be described later.

In addition, the control module 200 serves to verify whether the virtual code is a code normally generated by the control signal generation module 100. A detailed description of how the control module 200 determines whether the virtual code is normal will be described later.

The control module 200 receives the virtual code through the control signal transmitted including the virtual code from the control signal generation means including the control signal generation module 100. For this, the control signal generation means and the control device can transmit and receive control signals in various wireless communication methods.

That is, in one embodiment, the control signal generation means includes the first wireless communication module 120, and the control device includes the second wireless communication module 220. The second wireless communication module 220 receives the control signal generated by the control signal generation module 100 from the first wireless communication module 120. In addition, when the control device provides status information of the control device as a control signal generation means, the second wireless communication module 220 transmits a wireless communication signal including the state information to the first wireless communication module 120. The first wireless communication module 120 and the second wireless communication module 220 may transmit/receive signals using various communication methods such as Bluetooth, LTE, 3G, Wi-Fi, and RF.

In addition, in another embodiment, the first wireless communication module 120 and the second wireless communication module 220 perform a command verification dedicated code generation and verification process. That is, the first wireless communication module 120 may generate the command verification dedicated code in the same way as generating the virtual code in the control signal generation module 100. That is, the verification dedicated code generation function applies the same virtual code generation method to be described later (e.g., a method of generating a virtual code by the virtual code generation function in the control signal generation module and searching the actual command corresponding to the virtual code in the control module), so that the first wireless communication module 120 generates a command verification dedicated code, and the second wireless communication module checks whether the command verification dedicated code is normally generated, and confirms whether it is transmitted from the control signal generation means matched with the control device. The second wireless communication module 220 verifies the command verification dedicated code in the same manner as the method of verifying the virtual code in the control module 200. Different rules may be applied to the command verification dedicated code generation function than the virtual code generation function. At this time, the first wireless communication module 120 transmits the final code in the form in which the virtual code and the command verification dedicated code are combined to the second wireless communication module 220, and after separating the virtual code and the command verification dedicated code from the final code, the second wireless communication module 220 performs a verification process with the command verification dedicated code. The final code may be generated by a specific rule combining the command verification dedicated code and the virtual code, and the first wireless communication module 120 and the second wireless communication module 220 include the same combination rule.

Referring to FIG. 2, the control signal generation means according to the embodiments of the present invention includes: a control signal generation module 100; and a first wireless communication module 120. The control signal generation means may be a device in which a program corresponding to the control signal generation module 100 is embedded or a program or application corresponding to the control signal generation module 100 is installed. For example, the control signal generation means may be a smart phone in which an application corresponding to the control signal generation module 100 is installed or a wireless controller with a built-in control signal generation module 100.

The control signal generation module 100 serves to generate a virtual code according to a control command input from a user. In one embodiment, the control signal generation module 100 includes: a user command reception unit 101; virtual code generation unit 102; and a detail code generation unit 103.

The virtual code generation unit 102 serves to combine one or more detail codes to generate a virtual code. In one embodiment, the virtual code is generated by combining a plurality of detail codes according to a specific rule.

That is, in one embodiment, the virtual code generation function includes all or part of a detail code generation function and a detail code combination function. The detail code combination function is a rule for combining a plurality of detail codes. Various methods may be applied as a method of generating one virtual code by combining a plurality of detail codes. As an example of the detail code combination function, the virtual code generation unit 102 may generate a virtual code by alternately arranging an N-digit first code and an N-digit second code. Also, as another example, the detail code combination function may be a function combining the second code after the first code. As the number of detail codes included in the virtual function increases, the detail code combination function can also be generated in various ways.

The detail code generation unit 103 serves to generate one or more detail codes. The virtual code generation function includes each detail code generation function. For example, the virtual code generation function generates a plurality of detail codes by using a plurality of detail code generation functions, and generates a virtual code by using a detail code combination function that combines the plurality of detail codes.

In one embodiment, the detail code generation unit 103 includes the first function and the second function as a detail code generation function, and generates the first code and the second code. The first code and the second code have a correlation for searching the storage location of the command in the control device, but the control signal generation means only includes a first function for generating a first code and a second function for generating a second code as a detail code generation function to increase security, and may not include data on the correlation between the first code and the second code.

Also, as an embodiment, when the virtual code is generated by a combination according to a specific rule of the first code and the second code, the first code and the second code may perform a respective role for searching a storage location in which the command is stored. For example, the first code sets a starting point of a storage location search, and the second code sets a search path from the starting point to the storage location according to a specific search method. That is, if the virtual code normally generated for each unit count is provided from the control signal generation means, the control device determines the point moved along the search path corresponding to the second code from the search starting point corresponding to the first code as the storage location of the command. A specific method of searching the storage location based on the first code and the second code for configuring the virtual code will be described later.

As an embodiment of the method in which the detail code generation unit 103 generates a detail code, the detail code generation unit 103 generates a new detail code for each unit count, and accordingly, the control signal generation means generates a new virtual code for each unit count. Virtual codes newly generated for each unit count are not duplicated. Specifically, the detail code generation unit 103 not only does not duplicate the virtual code newly generated for each unit count for a period set for a specific user or a specific control signal generation means, and but also set up so that the virtual code is not duplicated even among users belonging to a particular group.

As a specific embodiment to prevent duplicate virtual code, when generating the N-digit first code or second code with M characters, the detail code generation function included in the virtual code generation function may generate $M^N$ codes as the first code or the second code, and match each code for each count from the initial time point at which the detail code generation function is run. For example, when the unit count is set to 1 second, different $M^N$ codes are matched every second from the time point at which the detail code generation function is initially run. And, if the period using a specific detail code generation function is set to a time length shorter than the time length corresponding to the $M^N$ count (e.g., $M^N$ seconds when 1 count is 1 second), the same code is not duplicated during the use cycle of the first code or the second code. That is, as the count increases over time, when the user makes a virtual code generation request to the control signal generation means at a specific time point, the control signal generation means may generate a code value matched with a count corresponding to a specific time point as the first code or the second code.

As another specific embodiment to prevent duplicate virtual code, when the use cycle of the virtual code generation function elapses, by changing the function that generates the first code or the second code (i.e. the first function or the second function) or changing the matching relationship between the first code and the second code, a virtual code different from the previous use cycle is generated. In a case where the virtual code is combined with the first code generated by the first function and the second code generated by the second function, when the first code generation function or the second code generation function is changed, as the order in which the first code or the second code appears is different from the previous use cycle, the control signal generation means can apply to a new use cycle a virtual code generation function that generates a virtual code different from the previous cycle. Further, the control signal generation means may select the first function and the second function so that the same code as the virtual code used in the previous use cycle does not appear as the virtual code of each count in the new use cycle (i.e., so that the matching relationship between the first code generated according to the first function and the second code generated according to the second function is not included in the matching relationship included in the previous use cycle in all counts of the new use cycle). That is, after a use cycle that can apply $M^N$ codes once elapses, by adjusting or updating the virtual code generation function, a virtual code generation function of a new use cycle that does not generate a virtual code overlapping with the previous use cycle can be applied.

At this time, the control signal generation module 100 and the control device may store a rule for updating the virtual code generation function. That is, the control signal generation module 100 and the control module 200 may store the order or rules for applying the plurality of first and second functions to each use cycle.

In addition, as another specific embodiment to prevent duplicate virtual code, in order to prevent the same virtual code from being generated at the same time point for different commands, any one of the first code or the second code included in the virtual code may be generated by reflecting a value (that is, a unique command value) that is always different at the same time point for at least each command. In one embodiment, the unique command value may be the elapsed time (or count number) from the unit count or time point (e.g., the time point at which the detail code generation function for a specific command is applied by saving a specific command after a specific time elapses from the first time point at which a specific storage location search algorithm in the control device is operated) corresponding to the storage location storing each command at the time of initial setting between a specific control device and the control signal generation means. When including multiple commands for one control device, if the count matching each command is not equal (that is, if multiple commands are not stored at the same location or time point on the storage location search algorithm), the elapsed time from the time point (or count) at which the command is matched to the time point at which the command input is performed from the user is different for each command. Accordingly, at least one of the detail code generation functions may make the virtual code generated by each control signal generation means different for each time point by using the elapsed time from the time point (or count) that stores the command in the storage location search algorithm to a specific time point as a unique command value. Through this, the control device can distinguish the control signal generation means only by receiving the virtual code without separately receiving data for distinguishing the user.

For example, if the control device is a drone (unmanned flying object), in the control signal generation means, a command that can be selected by a user's operation may include rising, falling, forward, backward, and the like. A command for a specific control device is set as a group, and a command search in the virtual code is performed by one storage location search algorithm included in the control device. In the storage location search algorithm, the first command (e.g., rising command) is matched to a time point that has elapsed by time A from the initial setting of the control device, and if the second command (for example, forward command) matches the time point that has elapsed by time B (B is a value greater than A), the first command and the second command always have different lengths of time elapsed from the card issuance time point at time C (C is a value greater than B) at which virtual code generation is requested from the first user and the second user. Therefore, the detail code generation function can prevent the same virtual code from being generated at the same time point as each command applies the length of time elapsed from the time point stored in the storage location search algorithm as a variable. In addition, the control device can accurately recognize each command even if two commands are received at the same time. The storage location search algorithm may be an algorithm in which a storage location matching a current count is changed as a count elapses. A detailed description of the storage location search algorithm will be described later.

In addition, since the length of time elapsed from the time point at which a specific command matches a specific storage location in the storage location search algorithm continues to increase over time, in the detail code (e.g., the second code) for a specific command, the same value is not generated, but different values are continuously generated.

In addition, as another specific embodiment to prevent duplicate virtual code, in order to prevent duplicate virtual codes from occurring regardless of the user in the entire cycle, the first code is set as a code value corresponding to the time point (or count) at which the virtual code generation request is made among the codes matched for each count from the initial time point (e.g., the time point in which the control device and the control signal generating means are initially linked, the first operation time point after the control device is produced, or the initialization time point) at which the first function for a specific command is driven in the control device, and the second code is set to a code value generated by reflecting the elapsed time (i.e., unique command value) from the time point at which the command is matched in the storage location search algorithm, and a virtual code may be used as a code value in which the first code and the second code are combined. Because the first code becomes a different code value for each count and the second code has a different code value for each command at the same time point, in the virtual code in which the first code and the second code are combined, different code values are output at all control signal generation means and at all time points.

In another embodiment, the virtual code includes a command identification code for distinguishing a command type. That is, when a specific command is input from the user, the virtual code generation unit 102 extracts the corresponding command identification code and includes the extracted command identification code in the virtual code. The command identification code allows the control module 200 to recognize a corresponding command immediately upon receiving the virtual code. After identifying the command through the command identification code, the control module 200 determines whether to input the command as a control command by verifying the virtual code based on the detail code in the virtual code.

In addition, the command identification code may be coupled to a predetermined location in the virtual code. When a virtual code generation function is given for each command, the control module 200 must be able to determine the command type by first extracting the command identification code from the virtual code. Accordingly, the command identification code may be coupled to a predetermined location in the virtual code (e.g., the first N digits of the virtual code) to be separable without a separate function.

If the virtual code includes a command identification code, as one embodiment, the control module 200 divides each command for a specific control device into a separate group and uses a separate storage location search algorithm or virtual code generation function for each command, and the control signal generation module 100 transmits a virtual code including a command identification code corresponding to each command.

Specifically, the virtual code generation unit 102 may generate a virtual code by adding a virtual security code generated based on the OTP function corresponding to a specific command to the command identification code. After receiving the virtual code, the control module 200 determines the command type using the command identification code, and verifies whether the virtual code is normally generated using the virtual security code. A method in which the control module 200 verifies the virtual code using the virtual security code will be described later.

In addition, the virtual code generation unit 102 generates a plurality of detail codes (e.g., the first code and the second code) matching the storage location search algorithm matched to the specific command identification code, and combines with the command identification code to generate virtual code. That is, the control module 200 may individually drive the storage location search algorithm for each command. Accordingly, the virtual code generation unit 102 may separately include a virtual code generation function for each command to correspond to the individual storage location search algorithm in the control module 200. The method of verifying the virtual code using the storage location search algorithm for each command and the detail code will be described later.

In addition, in another embodiment, any one of a plurality of enumeration rules for arranging M characters in an ascending order is applied to the virtual code generation function (specifically, each detail code generation function). That is, the control signal generation means (i.e., the control signal generation module 100) may apply different rules for arranging M characters in ascending order to the detail code generation function for each control device or each command. Specifically, a virtual code generation function to which different listing rules are applied for independent control of each device may be applied to each control device (i.e., for each device having a different identification value), and when the virtual code includes a command identification code, a virtual code generation function to which different listing rules are applied according to each storage location search algorithm may be applied.

For example, the listing rule for arranging uppercase letters of the alphabet in ascending order may be A, B, C, . . . , Z, which is a general order, or A, C, B, . . . , Z. As the listing rules are changed in the virtual code generation function, the order of matching codes to each count is changed from the initial time point at which the virtual code generation function is operated. In relation to the control module 200, a code generated according to the same listing rule may match each count, or the same listing rule itself may be included in the virtual code generation function and stored. Therefore, the virtual code generation function for each device or each command (If the virtual code includes the command identification code) includes a different detail code combination function or includes a different character listing rule, so that each group can have a different virtual code generation function.

Also, in one embodiment, the virtual code includes a virtual security code. For example, the virtual code includes at least one detail code and a virtual security code, or includes a virtual security code as a detail code. The security code is a code generated based on a specific security code generation function, and is used to verify whether it is a normal virtual code. The security code generation function generates a security code with a specific number of digits by using time data and a control signal generation means or a unique value of a control device as a function value.

An example of the process of determining whether the virtual code is normal by using the virtual security code is as follows. The control module 200 may receive the unique value (e.g., the unique value of the smart phone in which the control application is installed, etc.) of the control signal generation means at the time of initial setting and store the unique values together in the command's storage location or in a separate storage space connected to the command storage location. When the control signal generation means generates a virtual code including a virtual security code and provides the virtual code to the control device, the control device acquires the time data at which the virtual code is generated based on the detail code, and extracts the unique value of a specific control signal generation means stored inside and applies the unique value to a virtual security code generation function (e.g., One-Time Password (OTP) function) together with time data to calculate a virtual security code. The control device determines whether the virtual security code (i.e., received virtual security code) received from the control signal generation means matches the virtual security code (i.e., generated virtual security code) calculated by the virtual security code generation function stored inside. Since there may be a difference between the time point for generating the virtual code from the control signal generation means and the time point for receiving the virtual code from the control device 200, the control device 200 calculates a virtual security code (i.e., OTP number) within a specific time range (e.g., from the time point at which the virtual code is received until a specific count) in consideration of the time delay, and checks whether there is a value matching the received virtual security code received from the control signal generation means. If the received virtual security code and the generated virtual security code match, the control module 200 determines the command as a control command by determining that it is a normal virtual code.

In addition, as another example, the virtual security code generation function may generate a code of different I digits (I is a natural number) for each count and apply the code together as a function value. That is, the virtual security code generation function may include an I-digit random code generation function (e.g., an OTP function for generating an I-digit code).

The first wireless communication module 120 serves to output the virtual code as a wireless communication signal to transmit the virtual code to a control device. The first wireless communication module 120 may include various configurations that can provide virtual codes to the outside. The first wireless communication module 120 includes: all or part of a wireless Internet module; a short-distance communication module; and an RF signal module.

Figure 3:
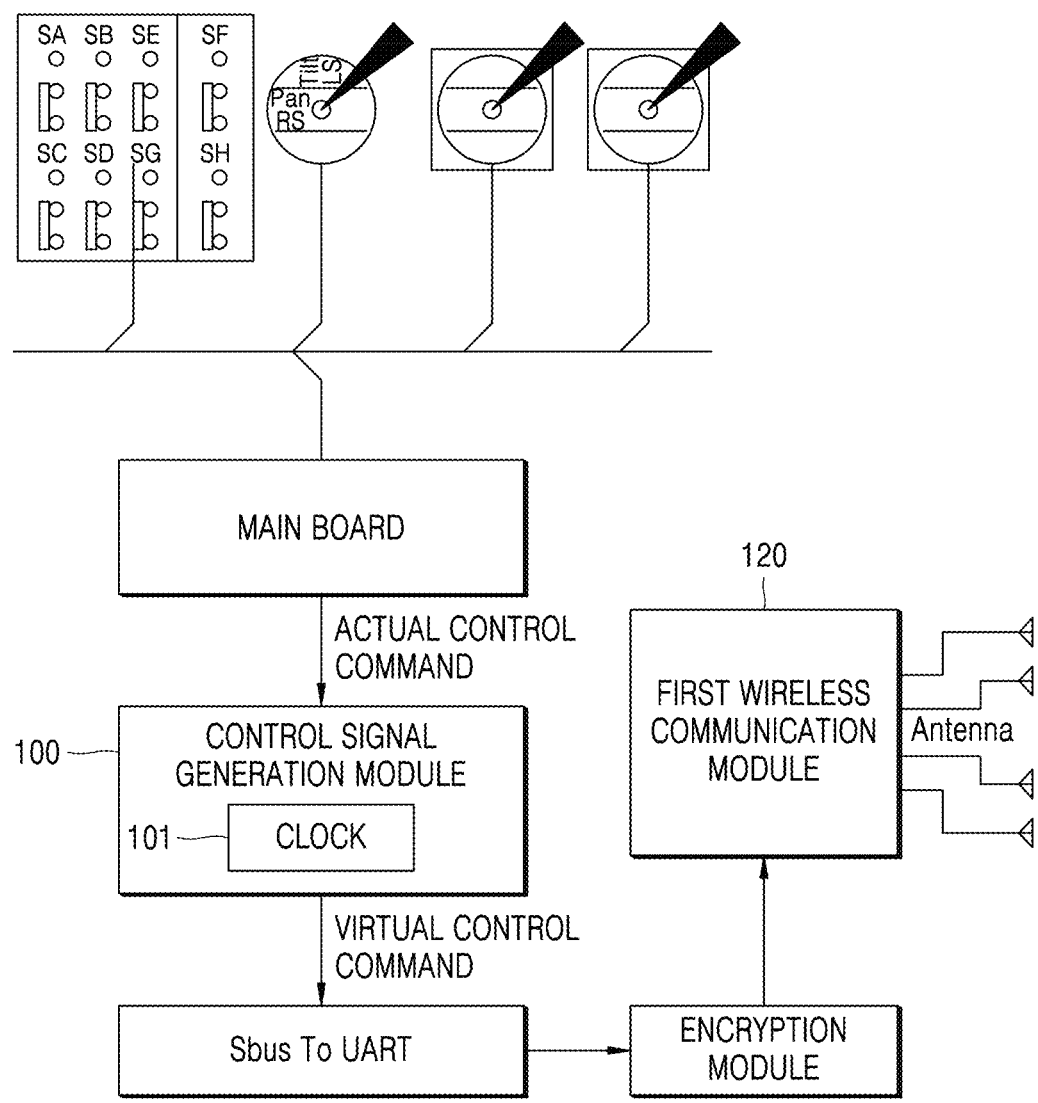
FIG. 3 is an internal configuration diagram of an unmanned moving object control signal transmission device according to an embodiment of the present invention.

FIG. 3 is a configuration diagram of a control signal transmission device of an unmanned moving object according to an embodiment of the present invention.

Referring to FIG. 3, a control signal transmission device of an unmanned moving object according to an embodiment of the present invention includes a control command input unit, a main board, a control signal generation module 100, and a first wireless communication module 120.

The control command input unit receives a control command for controlling an unmanned moving object from a user, and may be configured as a joystick, an operation button, a touch display, and the like.

The main board generates an operation command input through the control command input unit as a control command (i.e., a control command code according to a specific protocol). That is, when the unmanned moving object is an unmanned flying object (i.e., a drone), the main board calculates an actual flight command corresponding to the user's manipulation by the user.

The control command generation module 100 serves to generate an actual control command as a virtual control command. That is, the control command generation module generates a real-time virtual code corresponding to the actual command based on the built-in virtual code generation function. Although the virtual control command is a value that changes every unit time, but is a code that can search for the actual control command input by the user in the control module of an unmanned moving object.

For example, the virtual control command for each actual control command is changed and generated for each unit time, and when the actual control command includes a first control command and a second control command, the virtual control command for the first control command is generated not to overlap with the virtual control command for the second control command.

The control command generation module 100 may generate virtual control commands in various ways. Also, for example, the control command generation module 100 may generate a length that can be included in the protocol for transmitting the actual control command (e.g., a code having the same length as the actual control command) in order to maintain the existing communication protocol as it is.

The control signal generation module 100 includes a time calculation module (Clock) 101 to obtain time data necessary for driving a virtual code generation function (i.e., virtual control command calculation algorithm). The time calculation module (Clock) 101 can calculate time data by itself without using wireless communication.

The first wireless communication module 120 transmits the virtual control command generated by the control signal generation module through wireless communication. That is, the first wireless communication module 120 transmits a virtual control command in a communication method and communication protocol capable of communicating with the second wireless communication module in the unmanned moving object.

Also, in another embodiment, the control command input unit and the main board may be a commercial controller device (e.g., an RC controller). For example, the unmanned moving object control device may be of a form in which the control signal generation module 100 and the first wireless communication module 120 are additionally connected or coupled to a pre-fabricated controller device. Also, for example, if the unmanned moving object control device is the ground control device of a flying drone, since the commercial controller and the control signal generation module 100 are electrically connected and built in the ground control device, the control signal generation module 100 may receive a signal (i.e., an actual flight command) output from the main board in the controller, and generate a virtual control command.

In addition, in another embodiment, the unmanned moving object control device may include an encryption module. The encryption module performs a role of encrypting the transmission signal including the virtual control command once more based on the fixed encryption key.

Figure 5:
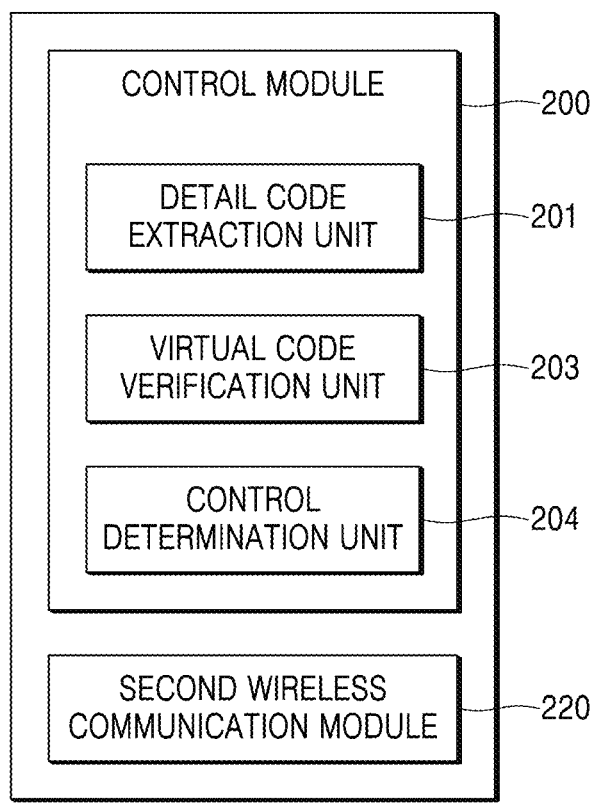

Referring to FIGS. 4 and 5, the control device according to another embodiment of the present invention includes a control module 200; and a second wireless communication module 220.

The second wireless communication module 220 serves to receive a control signal from the control signal generation means. Various wireless communication methods corresponding to the first wireless communication module 120 may be applied. Specifically, the second wireless communication module 220 may include a control signal reception unit for receiving the control signal transmitted at a specific time point from the control signal generation means. The control signal includes a specific virtual code.

The control module 200 extracts a virtual code from the control signal and serves to determine a command or verify that the virtual code is normally generated based on the detail code or command identification code extracted from the virtual code.

In one embodiment, as shown in FIG. 4, the control module 200 includes: a detail code extraction unit 201; and a command search unit 202. The detail code extraction unit 201 serves to extract a plurality of detail codes included in the virtual code. The virtual code is generated by combining a plurality of detail codes according to a specific rule, and the plurality of detail codes are differently generated according to the command at the same time point, and are generated differently for each unit count.

The detail code extraction unit 201 of the control module 200 includes the same detail code combination function as the control signal generation means, and the detail code extraction unit 201 may extract a plurality of detail codes from the virtual code by applying a detail code combination function. For example, when generating a virtual code in which two detail codes (i.e., a first code and a second code) are combined in the control signal generation means, the detail code extraction unit 201 may separate the first code and the second code by applying a detail code combination function from the character array of the virtual code.

The command search unit 202 serves to search a storage location including a specific command based on a plurality of detail codes. When a normally generated virtual code is received for each unit count, the command search unit 202 determines, as the storage location, a point moved from the starting point corresponding to the first code along a search path corresponding to the second code. A specific method for the control module 200 to determine the storage location will be described later in detail.

In addition, it may further include a virtual code verification unit (not shown). The virtual code verification unit serves to verify whether the virtual code is normally generated at the current time point. For example, when the virtual code includes an OTP code generated using time data and seed data (e.g., a chip unique value of a control device), the virtual code verification unit compares the first OTP code extracted from the virtual code with the second OTP code calculated at the current time point by the OTP function stored in the control module, and verifies whether the virtual code is generated at the current time point.

In another embodiment, as in FIG. 5, the control module 200 includes: a detail code extraction unit 201; a virtual code verification unit 203; and a control determination unit 204. The detail code extraction unit 201 extracts a command identification code and one or more detail codes included in the virtual code. The virtual code is generated by combining a command identification code and one or more detail codes according to a specific rule, and the detail code is generated differently according to the command at the same time point, and is generated differently for each unit count.

For example, the detail code extraction unit 201 extracts a command identification code at a predetermined location. Specifically, since the command identification code must be extracted first before a specific detail code combination function is determined, the control module 200 and the control signal generation module 100 are predetermined to attach the command identification code to a specific location (e.g., the first N digits of the virtual code), when receiving the virtual code, the control module 200 extracts a command identification code from a predetermined location. When it is determined that the virtual code is normally generated, the control module 200 determines a command corresponding to the command identification code as a control command.

In addition, when the virtual code includes only one detail code (e.g., virtual security code), the detail code extraction unit 201 determines the remaining codes except for the command identification code as the detail code.

In addition, when the virtual code includes a plurality of detail codes (e.g., the first code and the second code), the detail code extraction unit 201 separates a plurality of detail codes by using a detail code combination function in a virtual code generation function corresponding to a specific command. In addition, when a plurality of detail codes include a virtual security code, the detail code extraction unit 201 separately extracts the virtual security code.

The virtual code verification unit 203 verifies whether a virtual code is normally generated based on the one or more detail codes. In one embodiment, when only one virtual security code is included as the detail code, as described above, the control module 200 compares the virtual security code (i.e., the received virtual security code) generated and provided by the control signal generation module 100 and the virtual security code (i.e., the generated virtual security code) generated at the command reception time point in the control module 200 to verify whether the virtual code is normally generated (hereinafter, the first verification method).

In addition, in another embodiment, when the first code and the second code are included as a plurality of detail codes, by comparing whether the command is included in the storage location searched by applying the first code and the second code to the storage location search algorithm corresponding to the specific command identification code, or whether the command in the storage location and the command corresponding to the command identification code match, it is verified whether the virtual code is normally generated (hereinafter, the second verification method). A method in which the control module 200 searches for a storage location in the storage location search algorithm using the first code and the second code will be described later.

In addition, in another embodiment, when including a first code, a second code and a virtual security code as a plurality of detail codes, the control module 200 verifies whether the virtual code is normally generated by applying at least one of the first verification method and the second verification method.

The control determination unit 204 inputs a command corresponding to the command identification code if the virtual code is normally generated. That is, the control determination unit 204 drives the control device by determining the command corresponding to the command identification code in the normally generated virtual code as the control command.

Figure 6:
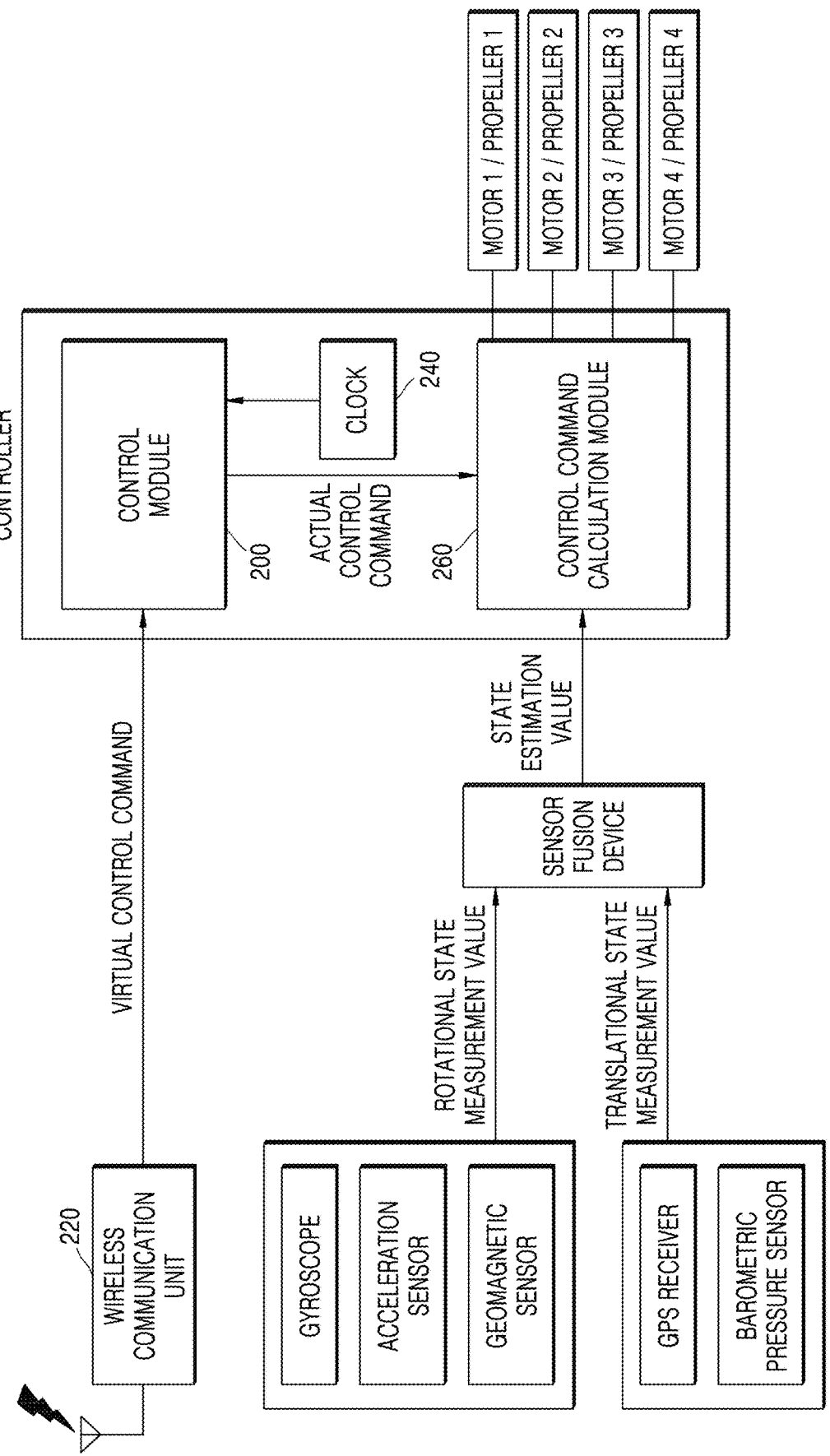
FIG. 6 is an internal configuration diagram of an unmanned moving object controlled based on a virtual control command according to an embodiment of the present invention.

FIG. 6 is a configuration diagram of an unmanned moving object controlled based on a virtual code according to an embodiment of the present invention.

Referring to FIG. 6, an unmanned moving object according to an embodiment of the present invention includes a second wireless communication module 220, a controller, and a sensor module.

The second wireless communication module 220 serves to receive a wireless communication signal including a virtual control command from the unmanned moving object control device.

The sensor module serves to acquire sensing data for controlling an unmanned moving object. For example, when the unmanned moving object is a flying drone, the sensor module may include a gyroscope, an acceleration sensor, a geomagnetic sensor, a GPS receiver, a barometric pressure sensor, and the like.

In addition, when the sensor module includes a plurality of sensors, the sensor module further includes a sensor fusion device. The sensor fusion device fuses the state measurement values (e.g., a rotational motion state measurement value obtained through a gyroscope, accelerometer, or geomagnetic sensor, or a translational motion state measurement value obtained through a GPS receiver or barometric pressure sensor) obtained through multiple sensor data to calculate a state estimation value of the unmanned moving object and transmit the calculated state estimation value to the controller.

The controller serves to calculate a control command to be provided to one or more driving units (e.g., a motor) based on a virtual control command. The controller includes: a control module 200 for calculating an actual control command based on a virtual control command; a time measurement module 240 for providing time data to the control module 200; and a control command calculation module 260 for calculating a control command based on the actual control command transmitted from the control module 200 and the state estimation value provided from the sensor module.

In one embodiment, the control module 200 includes a detail code extraction unit for extracting one or more detail codes from the virtual control command; and a command search unit for searching for an actual control command based on the detail code. In addition, the control module 200 may further include a verification unit that verifies whether the virtual control command is normally generated at the current time point. A detailed description of each configuration in the previously described control module will be omitted.

The control command calculation module 260 receives the actual control command from the control module 200 and the state estimation value from the sensor module, and calculates individual control commands for one or more driving units (e.g., motors) for moving an unmanned moving object according to a control command requested from a user. For example, the control command calculation module 260 reflects the state estimation value obtained from the sensor module in order for stable movement when controlling each driving unit based on the actual control command. In addition, when a plurality of driving units are used, the control command calculation module 260 calculates the movement of the individual driving units for achieving the control command, and then generates and transmits the individual control commands to the driving unit.

The control module 200 may be electrically connected by being inserted as a chip (e.g., in the case of a flying drone, Flight Controller) between the second wireless communication module 220 and the control command calculation module 260, and pre-process the virtual flight command received before the control command calculation module 260 while being included as a software module together in the chip in which the control command calculation module 260 is embedded.

Through this, the control method using the virtual control command can be applied without changing the basic structure and control process of the existing unmanned moving object (e.g., flying drone). In addition, when the control module 200 is included in the chip including the control command calculation module 260 together as software, hardware configuration is not added at all, so that an increase in the weight of an unmanned moving object may not occur.

Figure 7:
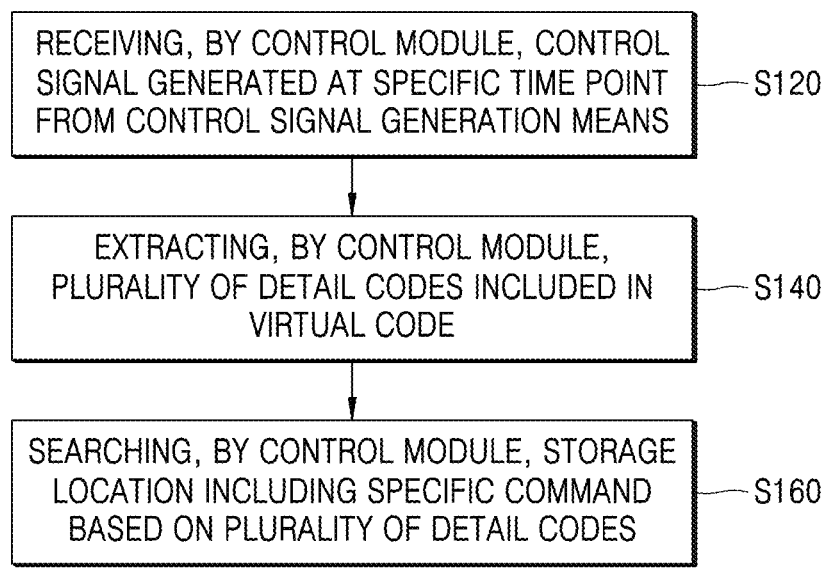
FIG. 7 is a flowchart of a device control method based on a virtual code according to an embodiment of the present invention.

FIG. 7 is a flowchart of a control signal-based control method including a virtual code according to an embodiment of the present invention.

Referring to FIG. 7, the control signal-based control method including a virtual code according to an embodiment of the present invention includes: receiving, by the control module 200, a control signal generated at a specific time point from the control signal generation means S120 (a control signal reception step); extracting, by the control module 200, a plurality of detail codes included in the virtual code S140 (detail code extraction step); and searching, by the control module 200, a storage location including a specific command based on a plurality of detail codes S160 (command search step).

The control module 200 receives the control signal generated at a specific time point from the control signal generation means S120 (control signal reception step). For example, the control module 200 acquires a virtual code included in the control signal received by the second wireless communication module 220 of the control device. The control signal includes a specific virtual code corresponding to a specific command.

The control module 200 extracts a plurality of detail codes included in the virtual code (S140). The control module 200 inversely applies the detail code combination function used when generating the virtual code to extract each detail code.

As described above, the virtual code is generated by a virtual code generation function corresponding to a specific control device and a specific command in the control signal generation module 100. The virtual code generates a plurality of detail codes by a plurality of detail code generation functions included in the virtual code generation function, and is generated by combining a plurality of detail codes according to a specific rule (i.e., a detail code combination function). That is, the virtual code generation function includes: a plurality of detail code generation functions for generating each detail code; and a detail code defect function for combining each detail code according to a specific combining rule. The detail code generation function applies a different coupling rule to each control device by reflecting the unique value of the control device or the unique value of the control signal generation means.

The virtual code is not duplicated regardless of the time point (or count) at which the command is input or command type. A detailed description of the above-described virtual code generation method will be omitted.

The control module 200 searches for a storage location including a specific command based on a plurality of detail codes S160 (command search step). A plurality of detail codes have a correlation with each other, and the control module 200 searches the command storage location based on the correlation between the detail codes.

The control module 200 stores a plurality of commands for a specific control device in storage locations corresponding to different initial unit counts. The control module 200 searches the initial unit count to which the command is matched through the first code and the second code in the virtual code corresponding to each command. In one embodiment, the initial unit count for each command is a specific number of counts elapsed from an initial set time point (e.g., the first time point at which the storage location search algorithm described later is driven) between the control module 200 and the control signal generation module 100. The control module 200 sets a different number of counts from an initial set time point according to a command.

Then, the control module 200 and the control signal generation module 100 set the virtual code generation function based on the initial unit count for each command (i.e., the number of unit counts elapsed from the initial setting time point). For example, when the virtual code consists of a first code and a second code that are detail codes, the first code is generated based on the number of unit counts that have elapsed from the initial time point to the current time point, and the second code is generated based on the number of unit counts elapsed from the time point corresponding to each command, the control module 200 and the control signal each generate a second function that generates a second code for each command. Through this, the control module 200 and the control signal generation module 100 may transmit/receive a command in the form of a virtual code.

In relation to a plurality of detail codes in the virtual code, the code generated for each unit count can be changed (e.g., when the virtual code consists of two detail codes, the first code and the second code are changed for each unit count), and even if the virtual code is changed for each unit count, in order to search the command storage location, the control module 200 adjusts a point matching the command storage location to a location corresponding to the changed first code and second code for each unit count.

As an embodiment of the correlation between the detail codes that configure the virtual code, when a normally generated virtual code is received for each unit count, the control module 200 determines a search starting point and a search path based on a plurality of detail codes and searches a storage location. Specifically, when the virtual code consists of a combination of the first code and the second code, the control module 200 may set the first code as a search starting point (i.e., a point where the search of the command storage location starts), and search the storage location by applying the second code as a path moving from the search starting point to the storage location. That is, when a normally generated virtual code is received for each unit count, the control module 200 determines that the search point moved along the search path corresponding to the second code from the starting point corresponding to the first code is a storage location or a point matching the storage location of the command (e.g., storage space matched to the search point in a separate server).

In one embodiment, when the second code includes all information on the path from the search starting point corresponding to the first code to the storage location, the control module 200 may find a command storage location or a point matching the storage location according to a search path corresponding to the second code from the search starting point corresponding to the first code.

In another embodiment, the control module 200 may include a storage location search algorithm that adjusts the storage location of the command to match the virtual code for each unit count. That is, the control module 200 includes a storage location search algorithm that adjusts a search path to a point matching the command storage location for each unit count. When the first code and the second code are changed for each unit count, the control module 200 may adjust the storage location search algorithm to match the changed first code and second code. The storage location search algorithm may be implemented in various forms.

Figure 8:
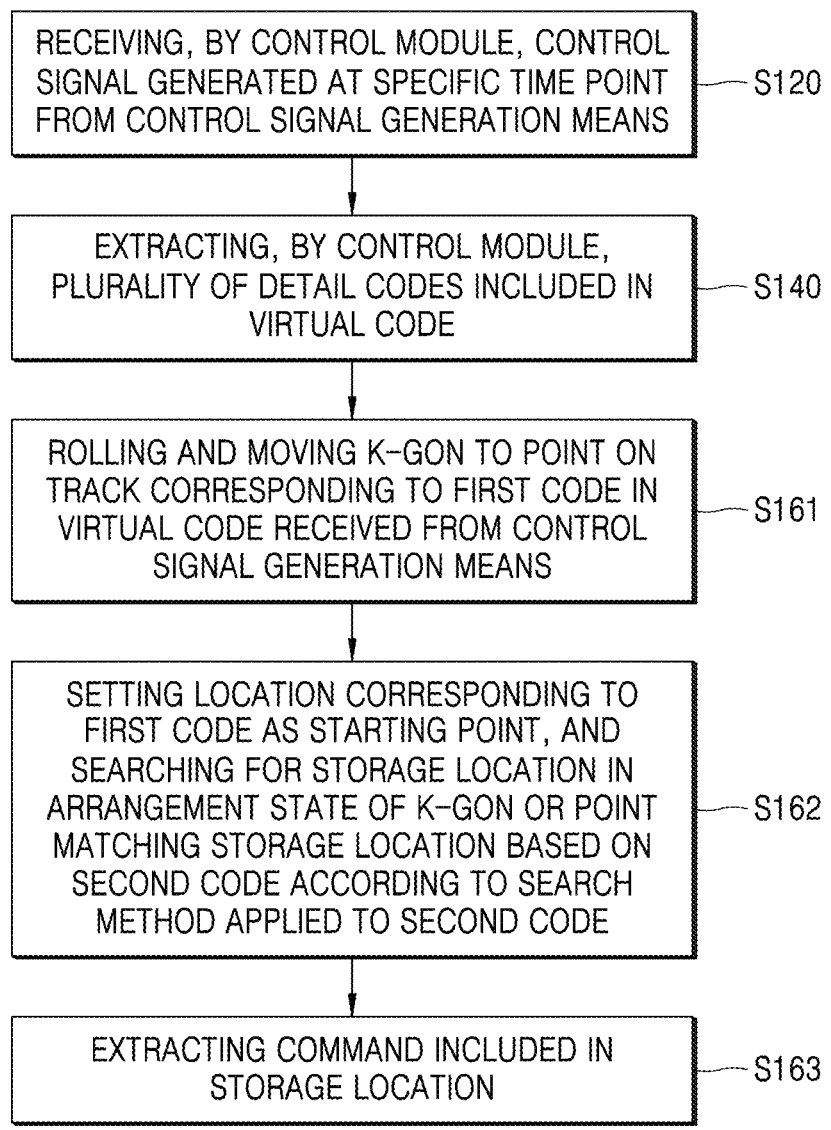
FIG. 8 is a flowchart of a virtual code-based device control method including a command search process according to k-gon roll and movement according to an embodiment of the present invention.

In one embodiment, as shown in FIG. 8, the storage location search algorithm may roll and move while the k-gonal vertices correspond to the points where each code is arranged on the track where k (k is $M^N$) codes are listed. At this time, the command search step S160 includes rolling and moving the k-gon, by the control module 200, to a point on the track corresponding to the first code in the virtual code received from the control signal generation means S161, setting a location corresponding to the first code as a starting point and searching a storage location in a k-shaped arrangement state or a point where the storage location is matched based on a second code according to a search method applied to the second code S162 (storage location search step); and extracting a command included in the storage location S163.

Figure 9:
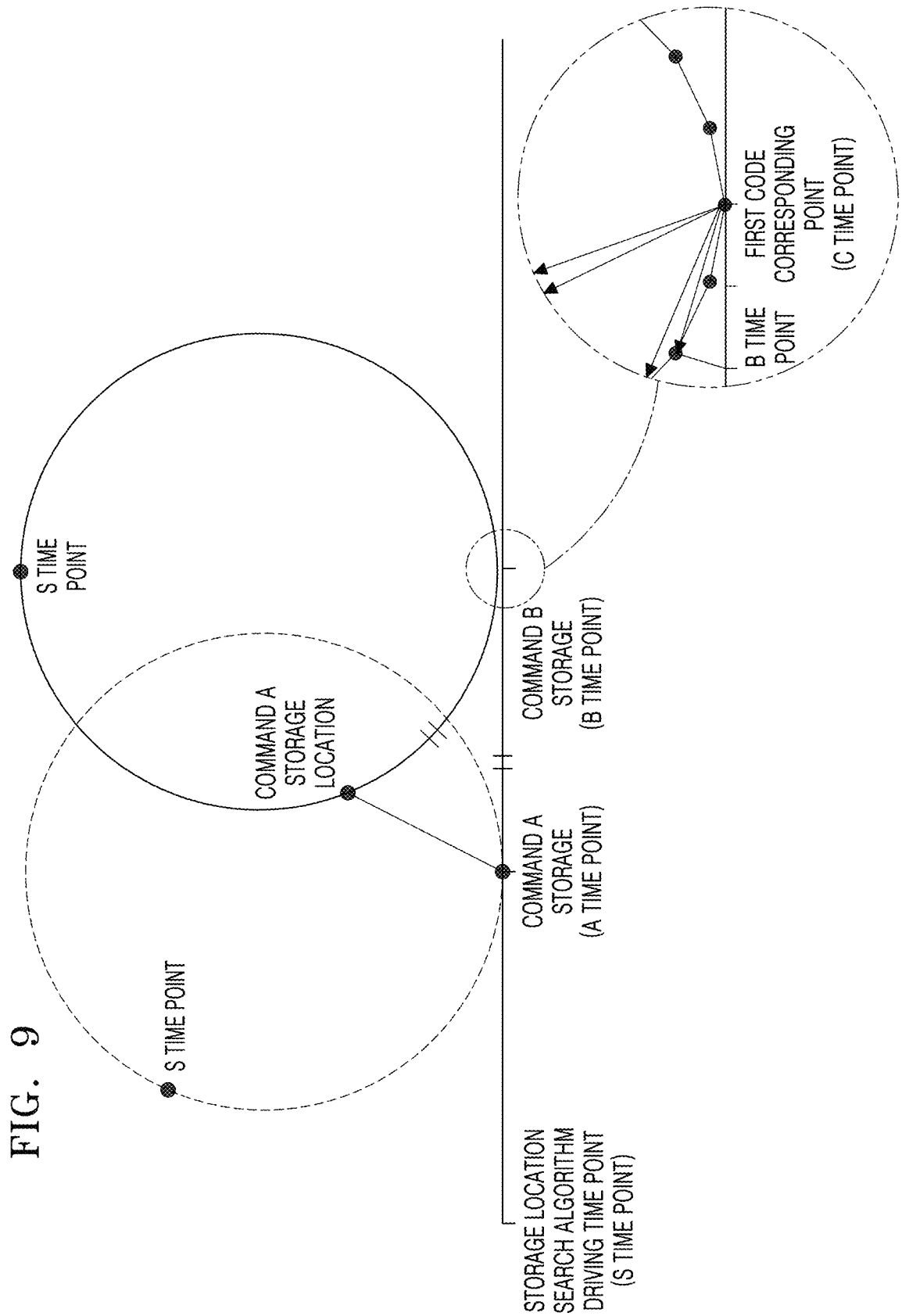
FIG. 9 is an exemplary diagram of a storage location search algorithm for searching a command storage location through roll and movement of a k-gon according to an embodiment of the present invention.

As shown in FIG. 9, the control module 200 rolls and moves the k-gon to a point on the track corresponding to the first code in the virtual code received from the control signal generation means (S161). The storage location search algorithm is a k-gon (k is $M^N$) that rolls and moves along the track where $M^N$ codes corresponding to the first code are listed, and the vertex of the k-gon moves while corresponding to the point at which the code is placed on the first code track. In this case, the control module 200 may apply roll and movement (or roll movement) to the k-gon so that the vertex of the k-gon is in contact with the point corresponding to the first code.

The control module 200, as shown in FIG. 9, sets the location corresponding to the first code as a starting point, and searches for a storage location in the arrangement state of the k-gon or a point matching the storage location (i.e., a specific vertex of the k-gon) based on the second code according to the search method applied to the second code S162 (storage location search step). The storage location matches each vertex of the k-gon. A point where the first code track (i.e., the first track) and the k-gon correspond becomes a storage location search starting point corresponding to the first code. The control module 200 searches the matching point of the storage location based on the second code from the search starting point.

Various methods may be applied as a method of searching the storage location in the k-gon based on the second code. As an example, as the k-gon indicates at an angle (e.g., a specific angle that divides 180 degrees into $M^N$ to face the vertex of the k-gon) corresponding to the second code at the location on the first track in contact, the control module 200 may search the vertex of k-gon, which is a storage location in which a command corresponding to the virtual code is stored.

In addition, as another example, in a state where k-gon is in contact with a point corresponding to the first code on the first track, the control module 200 divides the entire central angle (i.e., 360 degrees) into $M^N$ based on the center of the k-gon and the contact point on the first track, and matches each angle to the $M^N$ second codes. At this time, the direction of the line moving a specific number of unit angles (i.e., 360 degrees/$M^N$) from the line connecting the center of the k-gon and the contact point on the first track becomes a specific vertex of the k-gon. Accordingly, when the second code corresponding to a specific angle is received, the control module 200 may search for a vertex located in the corresponding angle direction.

Also, as another example, a specific digit of the second code may be used to determine the angle calculation direction. That is, when the second code is generated using N characters (N is a natural number), the angle measurement direction can be determined with one digit. For example, when matching the second code to each angle by dividing the entire central angle (i.e., 360 degrees) based on the center of the k-gon and the contact point on the first track, the control module 200 may determine, with a value of one digit, whether the angle is measured in the left direction or the angle is measured in the right direction from the line connecting the center of the k-gon and the contact point on the first track.

For example, in the storage location search algorithm, two different second codes may be assigned to one vertex according to the angle measurement direction at each vertex on the k-gon. That is, when reaching one vertex by an inner angle and by an outer angle, this is matched with another second code, and a different command can be connected. As another example, in the case of generating the second code using N (N is a natural number), the storage location search algorithm may match half of the total angle (e.g., 360 degrees when dividing based on the central angle) with N−1 pieces, and use one digit to determine the angle application direction to reach each vertex.

The method of searching the storage location in the k-gon based on the second code is not limited thereto, and various methods such as a method of searching as a storage location a point dividing a space between a point on the k-gon corresponding to the second code and a contact point on the first track by a specific ratio may be applied.

Then, the control module 200 extracts the command included in the storage location (S163). That is, the control module 200 finds a storage location corresponding to the vertex of the k-gon, and extracts a command in the storage location.

Figure 10:
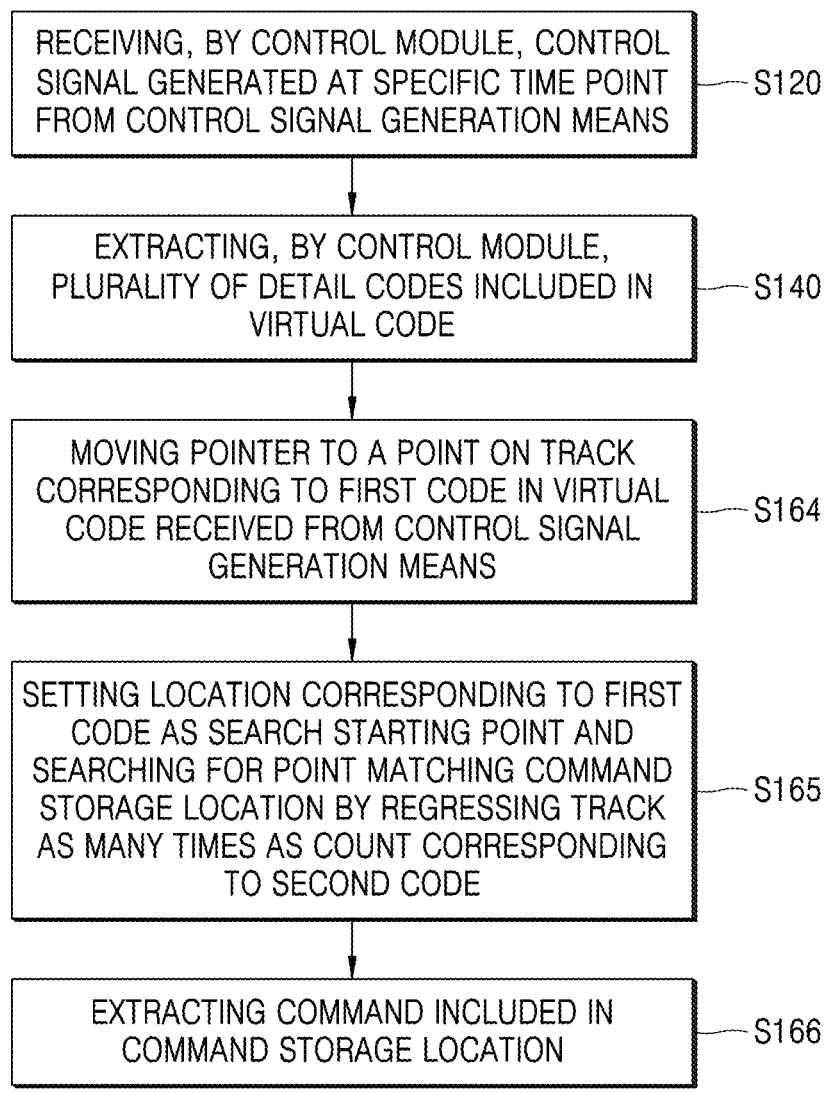
FIG. 10 is a flowchart of a virtual code-based device control method including a command search process through movement on a track according to an embodiment of the present invention.

Also, in another embodiment, the storage location search algorithm moves to a point matching the command storage location by moving on the track based on a plurality of detail codes configuring the virtual code. For example, the point matching the command storage location may be a point on the track corresponding to the count (i.e., time point) at which the command is stored in the control signal generation module 100. For this, when the storage location search algorithm moves the pointer based on the first code and the second code on one track, the command search step S160 includes, as shown in FIG. 10, moving the pointer to a point on the track corresponding to the first code in the virtual code received from the control signal generation means S164; setting a location corresponding to the first code as a search starting point and searching for a point matching the command storage location by regressing the track as many times as the count corresponding to the second code S165; and extracting the command included in the command storage location S166.

Figure 11:
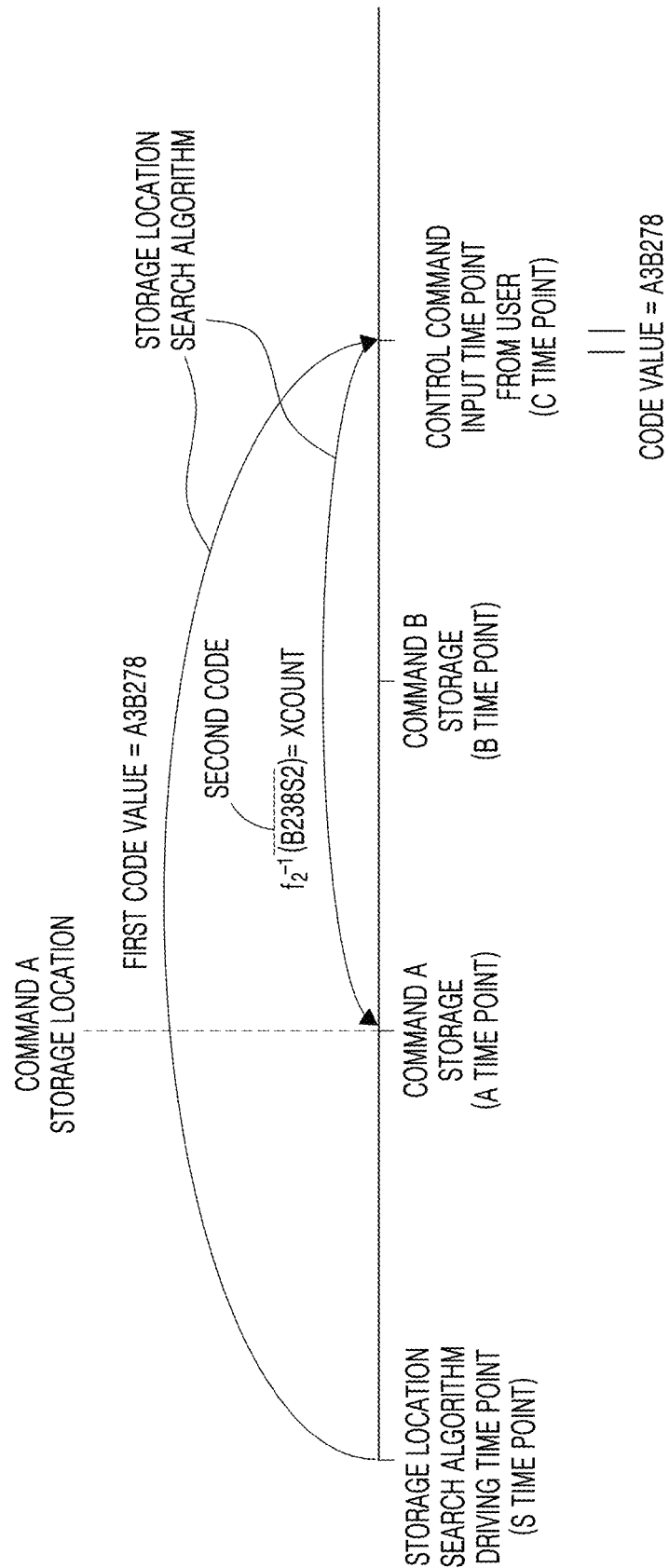
FIG. 11 is an exemplary diagram of a storage location search algorithm for searching a command storage location by moving on a track based on a detail code according to an embodiment of the present invention.

Specifically, referring to FIG. 11, when using the storage location search algorithm that moves based on the first code and the second code on one track, the control module 200 may move the division unit on the track whenever the unit count elapses from the time point at which the virtual code generation function is driven to the pointer starting from the track starting point, and determine a point on the track located at the command storage time point (A time point) as a point matching the command storage location. Specifically, when the virtual code includes a first code generated based on the time elapsed from the time point at which the virtual code generation function was driven and a second code generated based on the elapsed time from the time point at which the command is stored in the specific control signal generation module 100, the control module 200 sets the count on the track in which the code value corresponding to the first code is matched as the search starting point, and returns along the track from the search starting point by the count value calculated by applying the inverse function of the second function to the second code to search the storage location search algorithm for a point on the track of the time point at which the command is stored (i.e., a point matching the command storage location). The control module 200 controls the control device with the command extracted from the storage location.

In addition, in another embodiment, it further includes: verifying, by the control module 200, whether the first code or the second code corresponds to a normally generated virtual code by applying an inverse function of the first function or the second function. For example, when the first code is a code value corresponding to the number of counts elapsed from the first time point (i.e., the time point at which the control device is initially driven or initially set) at which a specific virtual code generation function and storage location search algorithm in the control module 200 are driven and the second code is a code value corresponding to the number of counts elapsed from a time point (i.e., a time point at which a specific count number matched to a specific command has elapsed from the initial time point) at which a specific command is matched, the control module 200 stores a time length Ts corresponding to a specific count number (i.e., the count number between the count matched with the specific command and the first time point) when storing the command in the storage location. The control module 200 calculates the elapsed time T1 from the time of driving the virtual code generation function to the virtual code generation time point by applying the inverse function of the first function to the first code in the virtual code and calculates the elapsed time T2 from the issuing of the command to the virtual code generation time point by applying the inverse function of the second function to the second code in the virtual code. Thereafter, the control module 200 verifies the virtual code by determining whether the difference between T1 and T2 corresponds to Ts.

Also, in another embodiment, the virtual code further includes a virtual security code. At this time, the control module 200 may extract a virtual security code from the virtual code and perform a process of verifying whether the virtual code is normally generated.

In one embodiment, the virtual security code may be generated based on a unique value of a control device or a control signal generation means. The unique value is a device unique value individually assigned to each control device or control signal generation module 100. For example, when an application corresponding to the control signal generation module 100 is installed using a specific smart phone as a control signal generation means, since the unique value is given to each smartphone, it cannot be verified unless a unique value is obtained by hacking the smartphone for malicious purposes or by secretly checking the user's smartphone. Accordingly, the control module 200 can verify the control signal generation means by receiving the virtual security code generated based on the unique value by the control signal generation means.

Also, in another embodiment, the control signal generation means may generate the virtual security code by reflecting the time value. That is, the control signal generation means can generate a virtual security code using a One Time Password (OTP) (user authentication using a randomly generated one-time password instead of a fixed password) method. The control module 200 receives the OTP number corresponding to the virtual security code from the control signal generation means, and verifies the control signal generation means by comparing the OTP numbers calculated in counts within a specific range from the counts receiving the OTP numbers from the control signal generation means. That is, the control module 200 stores the unique value of the control device or control signal generation module 100 together in the command storage location, and determines whether the OTP number generated using the unique value extracted from the command storage space matches the OTP number received from the control signal generation means at the time point at which the virtual code is received to verify the control signal generation means (that is, verifies whether the virtual code is generated by the control signal generation means matched with the control device).

In addition, as another embodiment, the virtual security code may be reflected in the generation of the first code and the second code without outputting the control signal generation module 100 to the outside. For example, the virtual code is configured with a first code and a second code generated based on a count obtained by adding a virtual security code to a time point corresponding to the initial unit count or a command input time point. At this time, the virtual security code may be a code value of a specific number of digits generated through an OTP function based on a unique value of a control signal generation means or a unique value of a control device, and as reflected in the generation of the first code and the second code, may not be provided separately from the control signal generation means to the control module 200.

Figure 12:
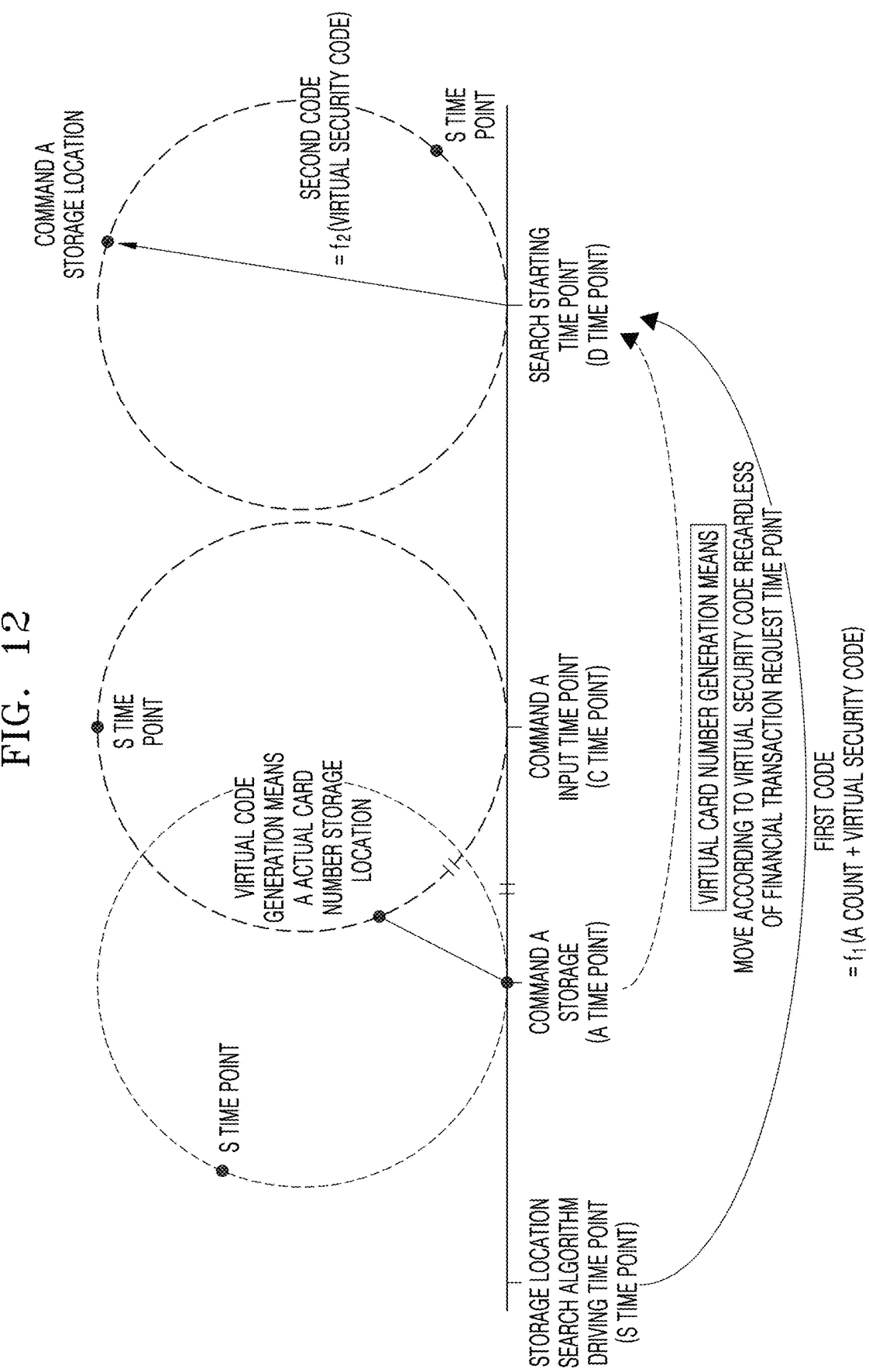
FIG. 12 is an exemplary diagram of a method of moving a command search time point using a virtual security code according to an embodiment of the present invention.

In one embodiment, as in FIG. 12, the control signal generation means generates the first code of the count by adding the virtual security code value generated based on the control signal generation means or the unique value of the control device to the command storage time point, and generates the second code of the count corresponding to the virtual security code value. That is, the first code and the second code are generated based on the count shifted by the virtual security code value from the A time point where the command is stored in the control signal generation means A. A count shifted from a time point may be a count before or after a count corresponding to the current time point according to the generated virtual security code value. The control module 200 may search for a point where the command storage location is matched by applying the received first code and the second code to a storage location search algorithm. Through this, it is impossible for others to check the order in which the first code and the second code for configuring the virtual code are provided, so that security can be improved.

Also, in another embodiment, after extracting the virtual security code from the second code generated based on the virtual security code, the control module 200 checks whether there is a value matching the virtual security code among the OTP numbers calculated by the virtual security code generation function (i.e., OTP function) entering a count within a specific range from the count of receiving the virtual code. The control module 200 applies the inverse function of the second function to the second code to obtain a virtual security code value (i.e., OTP function value) used to generate the second code, and finds a count that calculates the same value as the virtual security code value. As a difference exists between the time point at which the virtual security code is generated in the control signal generation module 100 and the time point at which the control module 200 receives the virtual security code by the transmission time of the virtual code, since the count of the control module 200 receiving the virtual code and the count of generating the OTP number corresponding to the virtual security code may not match, the control module 200 allows an error range from the count of receiving the virtual code. Through this, the control module 200 can verify whether the control signal generation module 100 that has transmitted the virtual code normally matches the command, so that security can be improved. In addition, even if the user does not input the virtual security code of a specific number when inputting the virtual code, since the control module 200 searches for the virtual security code by itself and verifies the control signal generation means (i.e., verify that the virtual code is generated by the control signal generation means matched with the control device), control signal generation means can be used conveniently.

Also, in another embodiment, the control signal generation means generates a first code corresponding to the count by adding the virtual security code value generated based on the control signal generation means or the unique value of the control device to the command input time point (i.e., the time point at which a control command corresponding to a specific command is input from the user to the control signal generation means), and generates a second code corresponding to the count by adding the virtual security code value and the count difference between the command storage time point (A time point) and the command input time point (C time point). That is, the reception by which the control signal generation means generates the first code and the second code is as follows.

First code=f1 (C time point count+virtual security code)
Second code=f2 (C time point count−A time point count+virtual security code)
(A time point: command storage time point, C time point: command input time point count, virtual security code: OTP number)

The control module 200 searches the command storage location based on the first code and the second code in the received virtual code, and extracts the control signal generation means or the unique value of the control device contained together in the command storage location. The control module 200 generates a virtual security code (i.e., OTP number) within a specific count range from the control signal reception time point based on the control signal generation means or the unique value of the control device. Thereafter, the control module 200 checks whether a count exists in which the sum of the number of counts up to each count within the specific count range and the virtual security code (i.e., OTP number) is equal to the count number (i.e., the value obtained by applying the inverse function of the second function to the second code) corresponding to the second code based on the initial storage time point (time point of receiving control signal from A time point) of the command. The control module 200 may identify a command initial storage time point by searching for a point where the command storage location is matched based on the first code and the second code. Through this, the control module 200 may check whether the control signal generation means providing the virtual code is normal (i.e., whether the control signal generation means that transmitted the virtual code matches the control device in 1:1) or whether the virtual code is normally generated.

Figure 13:
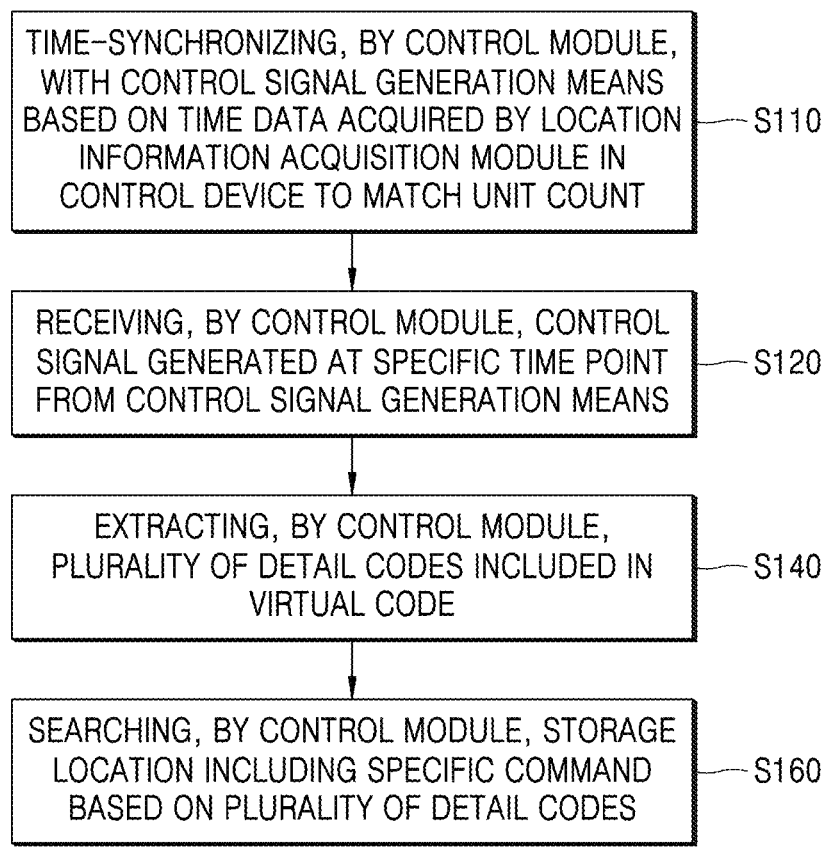
FIGS. 13 to 15 are flowcharts of a device control method based on a virtual code by a control module according to another embodiment of the present invention.

In addition, in another embodiment, as in FIG. 13, it further includes synchronizing, by the control module 200, the unit count with the control signal generation means based on the time data acquired by the location information acquisition module in the control device to match the unit count (S110). The control device and the control signal generation module 100 may include a location information acquisition module (e.g., a GPS module). Since the control module 200 and the control signal generation module 100 increase the unit count as time elapses, a time synchronization process is required to minimize the internal timer error. The control module 200 and the control signal generation module 100 can eliminate the timer error by performing synchronization with the time data acquired by the location information acquisition module.

Figure 14:
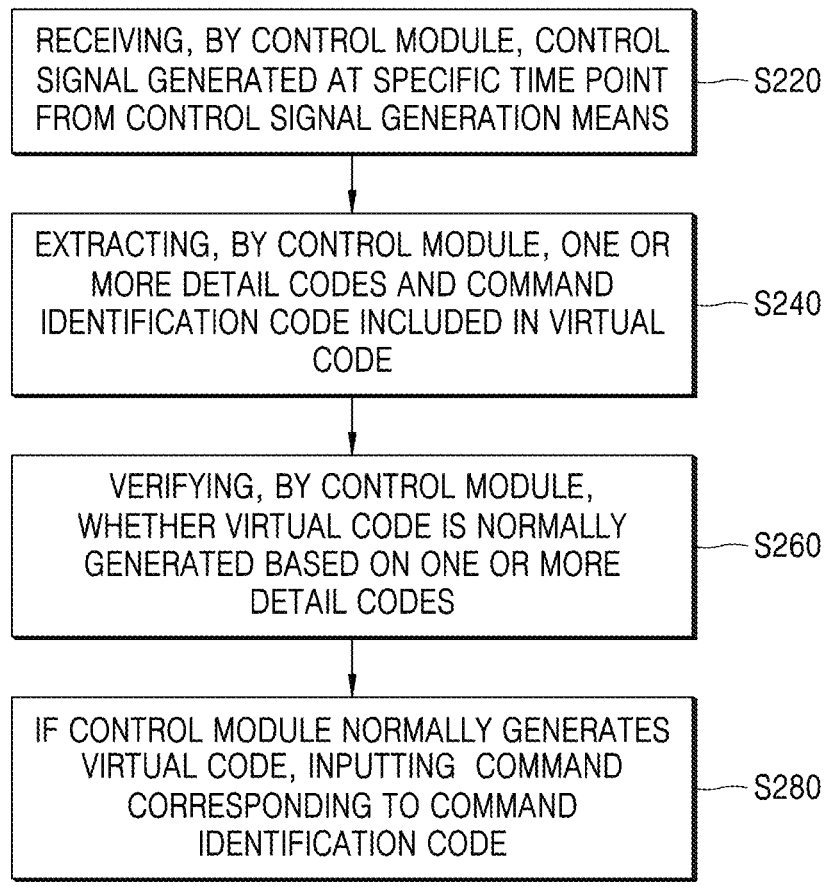

FIG. 14 is a flowchart of a control signal-based control method including a virtual code according to an embodiment of the present invention.

Referring to FIG. 14, the control signal-based control method including a virtual code according to another embodiment of the present invention includes: receiving, by the control module 200, a control signal generated at a specific time point from the control signal generation means S220 (control signal reception step); extracting, by the control module 200, one or more detail codes and the command identification code included in the virtual code S240; verifying, by the control module 200, whether a virtual code is normally generated based on the one or more detail codes S260; and inputting, by the control module 200, a command corresponding to the command identification code when the virtual code is normally generated S280. A detailed description of the previously described content will be omitted.

The control module 200 receives the control signal generated at a specific time point from the control signal generation means S220. The control signal includes a specific virtual code, and the virtual code is generated by combining a command identification code and one or more detail codes according to a specific rule. A detailed description of the above-described virtual code will be omitted.

The control module 200 extracts one or more detail codes and the command identification code included in the virtual code (S240). The virtual code is generated differently according to the command at the same time point, and is generated differently for each unit count.

If the virtual code includes a command identification code that the control signal generation means guides the command, the detail code extraction step S240 extracts a command identification code from within the virtual code, and determines the command type of the control signal generation module 100 based on the command identification code.

In addition, as described above, the command identification code may be coupled to a predetermined location so that the control module 200 can perform identification without using a separate function. For example, when the virtual code includes a plurality of identification codes, the process of determining the virtual code generation function using the command identification code may be performed before the process of extracting a plurality of detail codes. When the virtual code generation function is determined by the command identification code, the detail code combination function included in the virtual code generation function is determined to extract a plurality of detail codes. For this, in order for the control module 200 to easily perform separation without a separate function, the command identification code may be coupled to a fixed location in the virtual code (e.g., a specific number of digits in the front of the virtual code).

The command identification code determines the virtual code generation function or the storage location search algorithm for a specific command. Specifically, when using a different storage location search algorithm for each command, the control module 200 determines the storage location search algorithm corresponding to the command through the command identification code, and when transmitting only virtual security code as detail code in command identification code, determines a virtual security code generation function that generates a virtual security code corresponding to the command through the command identification code.

The control module 200 verifies whether a virtual code is normally generated based on the one or more detail codes S260. The control module 200 determines whether the control signal generation means for transmitting the virtual code is normally matched with the control device according to determining whether the virtual code is normally generated. Various methods may be applied as a method of determining whether the virtual code is normally generated.

Figure 15:
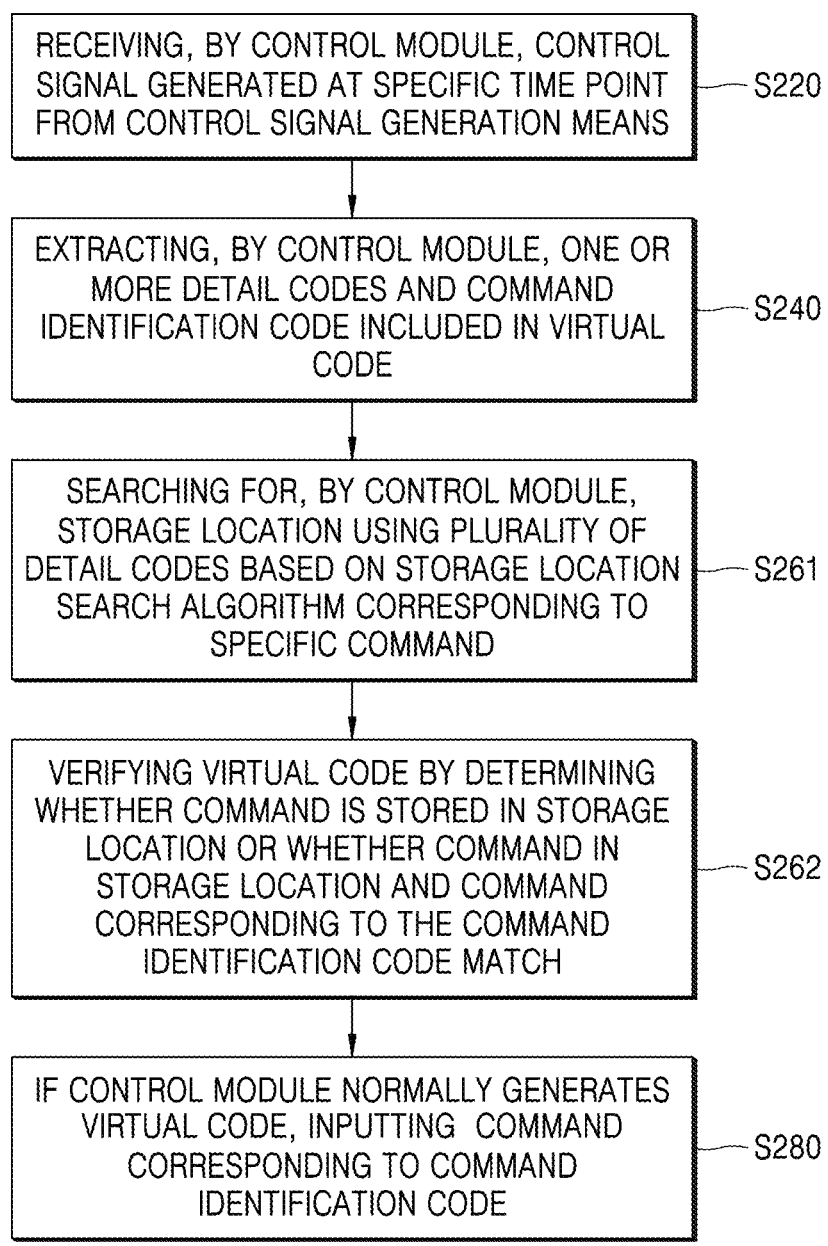

In addition, in another embodiment, as in FIG. 15, the virtual code verification step S260 includes: searching for, by the control module 200, a storage location using a plurality of detail codes based on a storage location search algorithm corresponding to a specific command S261; and verifying the virtual code by determining whether a command is stored in the storage location or whether a command in the storage location and a command corresponding to the command identification code match S262. A detailed description of the previously described detail code generation method and a detailed description of a storage location search method by the storage location search algorithm will be omitted.

In one embodiment, the virtual code includes a first code and a second code, and the control module 200 includes the storage location search algorithm different according to the command, and stores each command in a storage location corresponding to a specific command storage time point (i.e., initial unit count) in the storage location search algorithm of each command, and when a normally generated virtual code is received for each unit count, the control module 200 determines, as the storage location, a point moved from the starting point corresponding to the first code along the search path corresponding to the second code.

Also, in another embodiment, in relation to the virtual code verification step S260, the control module 200 compares the generated virtual security number calculated based on a time value within a specific range from the time point at which the virtual code is received with the received virtual security code extracted from the virtual code to verify whether the virtual code is normally generated. That is, the detail code includes a virtual security code. The virtual security code may be a code value of a specific number of digits generated through an OTP function based on a unique value of a control signal generation means or a unique value of a control device. A detailed description of a method of verifying the virtual code using the previously described virtual security code will be omitted.

The virtual code may include only the virtual security code as the detail code, or may include the virtual security code together with the first code and the second code. When the detail code is formed only with the virtual security code, the control module 200 determines the remaining codes except the command identification code from the virtual code as the virtual security code. In addition, the virtual security code may not be directly included in the virtual code and not transmitted since it is used when generating the first code and the second code. A detailed description of the method of using the virtual security code when generating the first code and the second code and the method of extracting the virtual security code from the first code and the second code will be omitted.

If the control module 200 has normally generated the virtual code, it inputs a command corresponding to the command identification code S280.

Figure 16:
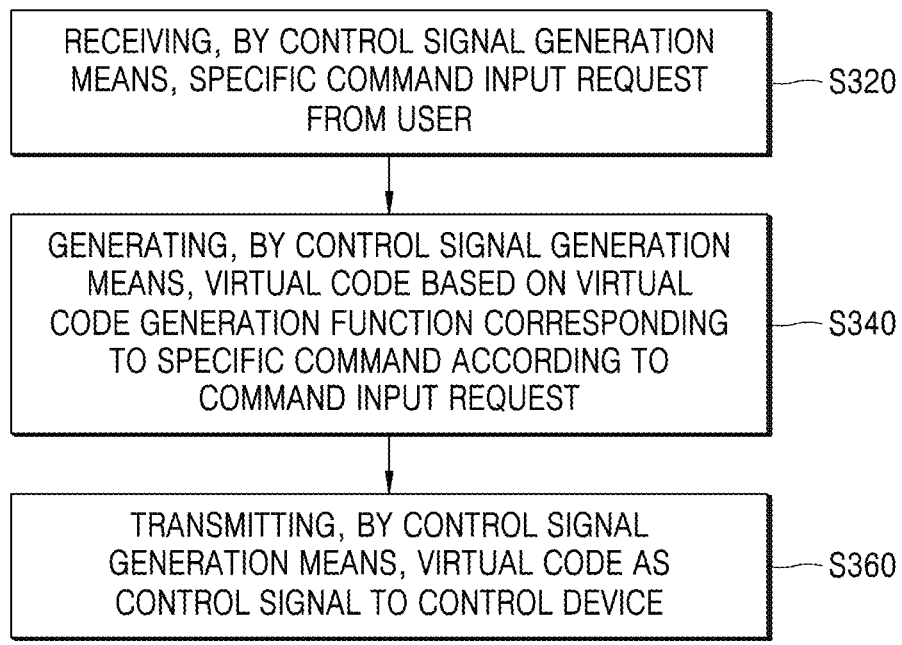
FIGS. 16 to 17 are flowcharts of a virtual code-based control method for a process in which a control signal generation module generates a virtual code according to an embodiment of the present invention.

FIG. 16 is a flowchart of a control signal-based control method including a virtual code according to an embodiment of the present invention.

Referring to FIG. 16, the control signal-based control method including a virtual code according to another embodiment of the present invention includes: receiving, by the control signal generation means, a specific command input request from the user S320; generating, by the control signal generation means, a virtual code based on a virtual code generation function corresponding to a specific command according to the command input request S340; and transmitting, by the control signal generation means, the virtual code as a control signal to the control device S360. Detailed description of the content previously described in the description of the control signal generation means will be omitted.

The control signal generation means receives a specific command input request from the user (S320). For example, the control signal generation means receives a command input request through the user's controller operation or user interface operation. A method of receiving a command input request is not limited to the described method, and various methods such as a method of receiving a voice command may be applied.

The control signal generation means generates a virtual code based on a virtual code generation function corresponding to a specific command according to a command input request (S340). The virtual code is generated differently according to the command at the same time point, and is generated differently for each unit count.

In one embodiment, the control signal generation means generates a first code and a second code by using a detail code generation function, and combines according to a specific rule (i.e., a detail code combination function) to generate a virtual code. At this time, the first code and the second code in the virtual code are used by the control module 200 in the control device for storage location search including a specific command.

Figure 17:
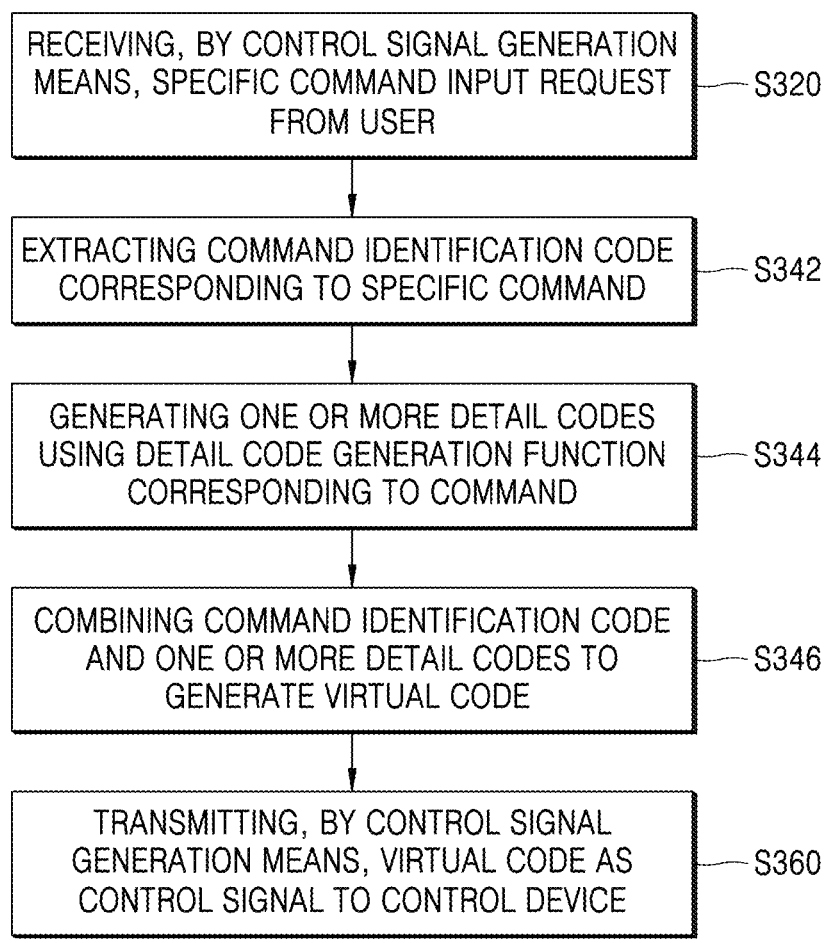

In addition, in one embodiment, as in FIG. 17, the control signal generation module 100 generates a virtual code in a form including a command identification code. For this, the virtual code generation step S340 includes: extracting a command identification code corresponding to a specific command S342; generating one or more detail codes using a detail code generation function corresponding to the command S344; and combining the command identification code and the one or more detail codes to generate the virtual code S346.

The control signal generation means transmits the virtual code as a control signal to the control device (S360). The control signal generation module 100 requests the first wireless communication module 120 to transmit in a wireless communication method that the second wireless communication module 220 of the control device can receive.

After that, the control module 200 extracts the virtual code in the control signal and then performs command determination and virtual code verification process. In one embodiment, in a case using one storage location search algorithm for a specific control device, when a normally generated virtual code is received for each unit count, the control module 200 determines, as the storage location, a point moved from the starting point corresponding to the first code among the detail codes according to the search path corresponding to the second code among the detail codes. The control module 200 determines a command in the storage location as a control command. In addition, in another embodiment, when a plurality of command identification codes are included in the virtual code, the control module 200 extracts one or more detail code and the command identification code included in the virtual code, and verifies whether a virtual code is normally generated based on the one or more detail codes, and inputs a command corresponding to the command identification code if the virtual code is normally generated.

The control signal-based control method according to an embodiment of the present invention described above may be implemented as a program (or application) to be executed in combination with a computer, which is hardware, and stored in a medium.

In order for the computer to read the program and execute the methods implemented as a program, the above-described program may include code coded in a computer language such as C, C++, JAVA, or machine language that can be read by a processor (CPU) of the computer through a device interface of the computer. Such code may include functional code related to a function defining functions necessary to execute the above methods, and the like, and may include an execution procedure related control code necessary for the processor of the computer to execute the functions according to a predetermined procedure. In addition, such code may further include additional information necessary for the processor of the computer to execute the functions or code related to memory reference for which location (address number) in the internal or external memory of the computer to be referenced. In addition, when the processor of the computer needs to communicate with any other computer or server in a remote location in order to execute the functions, the code may further include communication-related codes for how to communicate with any other remote computer or server using the communication module of the computer, and what information or media to transmit/receive during communication.

The storage medium is not a medium that stores data for a short moment, such as a register, a cache, a memory, etc., but a medium that stores data semi-permanently and can be read by a device. Specifically, examples of the storage medium include, but are not limited to, ROM, RAM, CD-ROM, magnetic tape, floppy disk, and optical data storage device. That is, the program may be stored in various recording media on various servers accessible by the computer or in various recording media on the computer of the user. In addition, the medium may be distributed in a computer system connected by a network, and computer-readable codes may be stored in a distributed manner.

In the above, embodiments of the present invention have been described with reference to the accompanying drawings, and those of ordinary skill in the art to which the present invention pertains will be able to understand that the present invention can be implemented in other specific forms without changing the technical spirit or essential features. Therefore, it should be understood that the embodiments described above are illustrative and non-limiting in all respects.

The invention claimed is:

1. A control device comprising:
a wireless communication module configured to receive a control signal transmitted at a specific time point from a control signal generation means, wherein the control signal comprises a virtual control command that is a specific virtual code;
a control module configured to extract the virtual control command from the control signal and then search for an actual control command corresponding to the virtual control command; and
a control command calculation module configured to calculate an individual control command for controlling one or more driving units based on the actual control command,
wherein the virtual control command for each actual control command is changed and generated for each unit time,
wherein when the actual control command includes a first control command and a second control command, the virtual control command for the first control command is generated not to overlap with the virtual control command for the second control command, and
wherein the virtual control command is generated by combining a plurality of detail codes used for searching by a control signal transmission device for an actual control command storage location.

2. The control device of claim 1, wherein the control module comprises:
a detail code extraction unit configured to extract a plurality of detail codes included in the virtual control command; and
a command search unit configured to search a storage location including a specific actual control command based on a plurality of detail codes,
wherein the virtual control command is generated by combining a first code and a second code included in a plurality of detail codes according to a specific rule,
wherein the first code or the second code is generated differently according to the actual control command at the same time point, and is generated differently for each unit count.

3. The control device of claim 2,
wherein the command search unit determines, as the storage location, a point moved along a search path corresponding to the second code from the starting point corresponding to the first code when a normally generated virtual control command is received for each unit count,
wherein the unit count is set at a specific time interval, and is changed as the time interval elapses.

4. The control device of claim 1, wherein the control module further comprises a virtual code verification unit that verifies whether a virtual code is normally generated at the current time point based on the one or more detail codes.

5. The control device of claim 1, wherein the control module and the control command generation module are embedded as software in one chip.

6. The control device of claim 1,
further comprising a sensor module including one or more sensors and calculating a state estimation value of the control device based on the sensed data,
wherein the control command calculation module is configured to calculate the individual control command by reflecting the state estimation value in the actual control command obtained from the control module.

7. A control signal transmission device comprising:
a control command acquisition module configured to acquire an actual control command based on a user's manipulation input;
a control signal generation module configured to generate a virtual control command in real time based on the actual control command; and
a wireless communication module configured to transmit the virtual control command to a control device based on a specific protocol,
wherein the virtual control command for each actual control command is changed and generated for each unit time,
wherein when the actual control command includes a first control command and a second control command, the virtual control command for the first control command is generated not to overlap with the virtual control command for the second control command,
wherein the virtual control command is generated by combining a plurality of detail codes used for searching for an actual control command storage location in a control module in the control device.

8. The control signal transmission device of claim 7, wherein the virtual control command is generated with the same code length as the actual control command.

9. The control signal transmission device of claim 7, wherein the virtual control command is generated by using a unique value of the control signal transmission device connected to the control device as seed data.

* * * * *